(12) United States Patent
Sugita

(10) Patent No.: US 8,018,460 B2
(45) Date of Patent: Sep. 13, 2011

(54) VECTOR GRAPHICS SHAPE DATA GENERATION APPARATUS, RENDERING APPARATUS, METHOD, AND PROGRAM

(75) Inventor: Kaoru Sugita, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 956 days.

(21) Appl. No.: 11/858,521

(22) Filed: Sep. 20, 2007

(65) Prior Publication Data

US 2008/0079728 A1 Apr. 3, 2008

(30) Foreign Application Priority Data

Sep. 28, 2006 (JP) ................................. 2006-265755

(51) Int. Cl.
*G06T 11/20* (2006.01)

(52) U.S. Cl. ...................................................... 345/441
(58) Field of Classification Search .................. 345/441
See application file for complete search history.

(56) References Cited

U.S. PATENT DOCUMENTS

| 5,233,685 | A | * | 8/1993 | Landes et al. ................. 715/234 |
| 5,293,477 | A | * | 3/1994 | Matoba .......................... 345/467 |
| 5,757,384 | A | * | 5/1998 | Ikeda et al. .................... 345/468 |
| 5,945,976 | A | * | 8/1999 | Iwamura et al. ............... 345/419 |
| 5,977,949 | A | * | 11/1999 | Itou et al. ....................... 345/467 |
| 6,011,561 | A | * | 1/2000 | Shigi et al. ..................... 345/471 |
| 2003/0001864 | A1 | * | 1/2003 | Charpentier ................... 345/619 |
| 2005/0226517 | A1 | * | 10/2005 | Kimura et al. ................. 382/243 |
| 2007/0229506 | A1 | * | 10/2007 | Sugita et al. ................... 345/441 |

FOREIGN PATENT DOCUMENTS

EP 0 471 482 A2 2/1992

OTHER PUBLICATIONS

A new contour fill algorithm for outlined character image generation; Shao Lejun and Zhou Hao School of EEE, Nanyang Technological University, Nanyang Avenue, Singapore 2263 Computers & Graphics, vol. 19, Issue 4, Jul.-Aug. 1995, pp. 551-556 Computer Graphics Art.*
U.S. Appl. No. 11/686,567, filed Mar. 15, 2007, Kaoru Sugita, et al.
Charles Loop, et al., "Resolution Independent Curve Rendering using Programmable Graphics Hardware", In Proc. of ACM SIGGRAPH2005, ACM Transactions on Graphics, vol. 24, Issue 3, Jul. 2005, pp. 1000-1009.
Yoshiyuki Kokojima, et al., "Resolution Independent Rendering of Deformable Vector Objects using Graphics Hardware", In Proc. of ACM SIGGRAPH 2006 Sketches, Jul. 2006, 1 Page.

* cited by examiner

*Primary Examiner* — Javid A Amini
(74) *Attorney, Agent, or Firm* — Oblon, Spivak, McClelland, Maier & Neustadt, L.L.P.

(57) ABSTRACT

Shape-data-generation apparatus includes unit acquiring first-shape data of vector graphics from data source, unit storing sets of second-shape data as structured-vector-graphics data obtained by processing vector-graphics-shape data in specific format and shape number corresponding to second-shape data, unit reading second-shape data corresponding to designated shape number from first storage unit, unit reconstructing vector-graphics shape corresponding to read second-shape data, unit calculating shape-difference-evaluated-value which decreases as similarity between vector-graphics shape corresponding to first-shape data and reconstructed-vector-graphics shape increases to obtain shape-difference-evaluated values, unit calculating minimum shape-difference-evaluated value of shape-difference-evaluated values and new second-shape data corresponding to minimum shape-difference-evaluated value, unit comparing minimum shape-difference-evaluated value with threshold, and unit calculating difference-shape data representing difference shape between shape based on first-shape data and shape based on new second-shape data if minimum shape-difference-evaluated value is not more than threshold.

4 Claims, 19 Drawing Sheets

```
Example of vector graphics shape data

Outline start symbol
Vertex coordinate P0
Quadratic Bezier curve symbol
Vertex coordinate P1
Vertex coordinate P2
Line segment symbol
Vertex coordinate P3
Quadratic Bezier curve symbol
Vertex coordinate P4
Vertex coordinate P5
Line segment symbol
Vertex coordinate P6
Outline end symbol
```

Example of structured vector graphics shape data
(1)

Shape number S
Vertex rotation direction C
Scaling coordinate value K
Outline start symbol
Vertex coordinate P0
Line segment symbol
Vertex coordinate P1
Vertex coordinate P2
Vertex coordinate P3
Line segment symbol
Vertex coordinate P4
Quadratic Bezier curve symbol
Vertex coordinate P5
Vertex coordinate P6
Outline end symbol

401

Example of structured vector graphics shape data
(2)

Shape number S
Reference shape number R
Vertex rotation direction C
Scaling coordinate value K
Outline start symbol
Reference vertex number N0、Relative coordinate V0
Line segment symbol
Reference vertex number N1、Relative coordinate V1
Reference vertex number N2、Relative coordinate V2
Reference vertex number N3、Relative coordinate V3
Line segment symbol
Reference vertex number N4、Relative coordinate V4
Quadratic Bezier curve symbol
Reference vertex number N5、Relative coordinate V5
Reference vertex number N6、Relative coordinate V6
Outline end symbol

402

F I G. 4

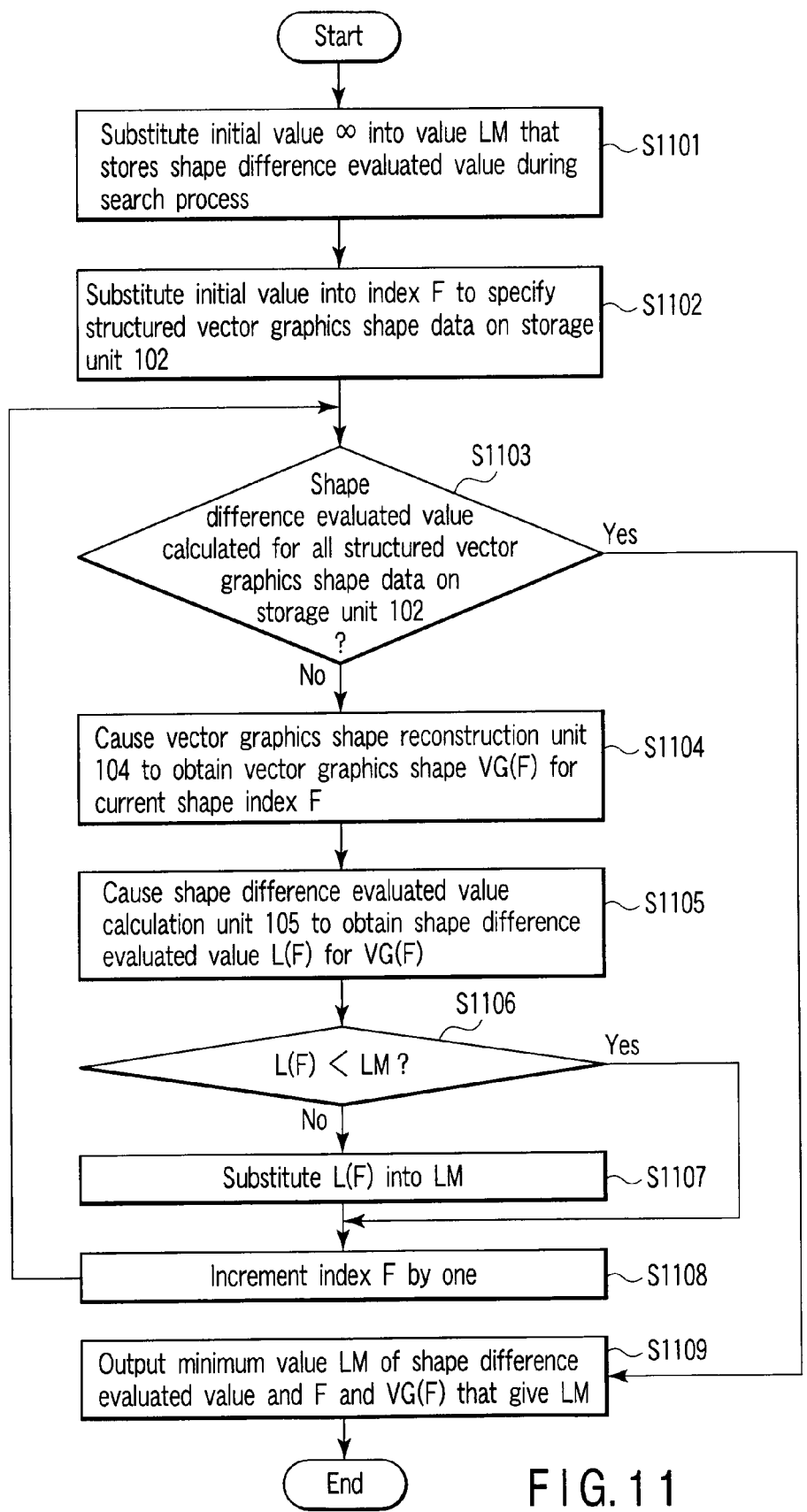
F I G. 11

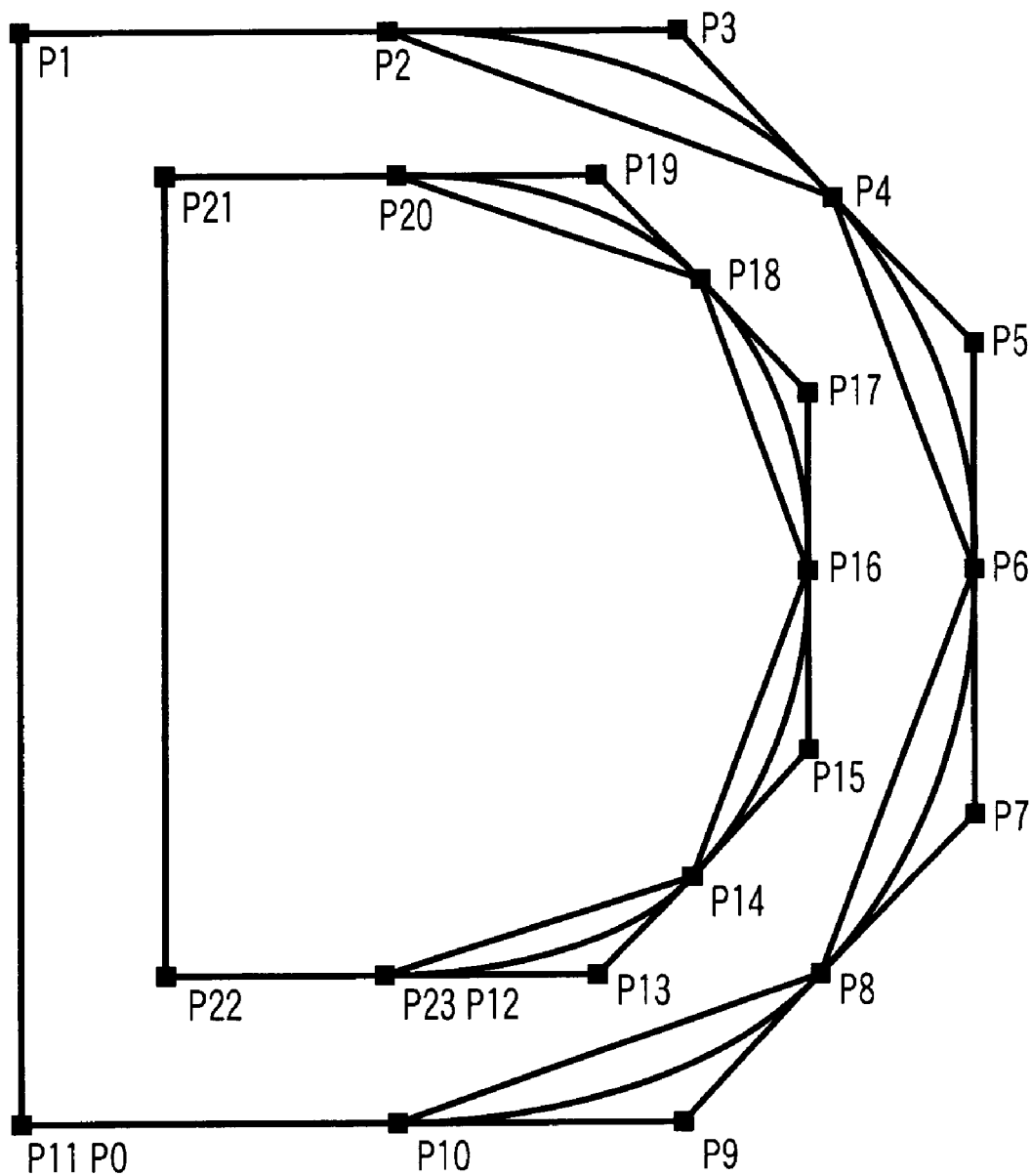
F I G. 13

Example of outline font shape data

Outline start symbol
Vertex coordinate P0
Line segment symbol
Vertex coordinate P1
Vertex coordinate P2
Quadratic Bezier curve symbol
Vertex coordinate P3
Vertex coordinate P4
Quadratic Bezier curve symbol
Vertex coordinate P5
Vertex coordinate P6
...
Outline end symbol Outline start symbol
Vertex coordinate P12
Quadratic Bezier curve symbol
Vertex coordinate P13
Vertex coordinate P14
Quadratic Bezier curve symbol
Vertex coordinate P15
Vertex coordinate P16
...
Outline end symbol

FIG. 14

Example of outline font contour information data

Outline font number F
Contour number C0
Shape number S0
Contour number C1
Shape number S1
...

FIG. 15

Example of outline font contour information data

Font type T
Character code F
Contour number C0
Shape number S0
Contour number C1
Shape number S1
...

FIG. 17

Example of outline font contour information data

Font type T
Character code F
Character structure information
Contour number C0
Shape number S0
Contour number C1
Shape number S1
...

VECTOR GRAPHICS SHAPE DATA GENERATION APPARATUS, RENDERING APPARATUS, METHOD, AND PROGRAM

CROSS-REFERENCE TO RELATED APPLICATIONS

This application is based upon and claims the benefit of priority from prior Japanese Patent Application No. 2006-265755, filed Sep. 28, 2006, the entire contents of which are incorporated herein by reference.

BACKGROUND OF THE INVENTION

1. Field of the Invention

The present invention relates to a vector graphics shape data generation apparatus, rendering apparatus, method, and program for rendering an image.

2. Description of the Related Art

Along with popularization of high-definition (HD) video devices including an HDTV, HD DVD, and next-generation home game device, a technique of efficiently rendering high-quality vector graphics and outline fonts in a high-definition computer graphics (CG) image is expected to be necessary in the future.

To efficiently render vector graphics by using a graphics processing unit (GPU) serving as a graphics LSI, a technique is used which causes a GPU to render a closed curve including two kinds of contours, i.e., line segments and quadratic Bezier curves, based on the fact that a pixel shader recently installed in a GPU can determine whether each pixel falls inside or outside a quadratic Bezier curve (e.g., C. Loop and J. Blinn, "Resolution Independent Curve Rendering using Programmable Graphics Hardware", In Proc. of ACM SIGGRAPH2005, pp. 1000-1009).

More specifically, a closed curve is segmented into parts each formed from a single quadratic Bezier curve and contour parts each including no curves but only straight lines. The single quadratic Bezier curve contour parts are rendered by a pixel shader while the linear contour parts are rendered by triangulation. It is possible to render a smooth curve independently of the display resolution by causing the pixel shader to determine whether each pixel falls inside or outside a quadratic Bezier curve.

This method requires to segment the interior of a linear contour part by triangulation in advance on the CPU. However, when the stencil buffer function of the GPU is used, render contour information can be rendered directly on the GPU. This enables us to render an outline font on the basis of the contour information stored on a video memory.

To display a Japanese outline font, it is necessary to hold the contour shapes of kanji characters which have a large number of strokes. The contour shape of one kanji character includes hundreds to thousands vertex coordinates. A Japanese font has thousands to tens of thousands of character types. There are also font designs such as Maru-Gothic, Kaku-Gothic, and Mincho. A technique is therefore required to efficiently store the shape information of character fonts in a limited memory area such as a graphics memory.

BRIEF SUMMARY OF THE INVENTION

In accordance with a first aspect of the invention, there is provided a vector graphics shape data generation apparatus comprising: an acquisition unit configured to acquire a first shape data element of vector graphics from a data source; a first storage unit configured to store a plurality of sets of a second shape data element as structured vector graphics data obtained by processing vector graphics shape data in accordance with a specific format and a shape number corresponding to the second shape data element; a first read unit configured to read the second shape data element corresponding to a designated shape number from the first storage unit; a reconstruction unit configured to reconstruct a vector graphics shape corresponding to the read second shape data element; a first calculation unit configured to calculate a shape difference evaluated value which decreases as a similarity between a vector graphics shape corresponding to the first shape data element and the reconstructed vector graphics shape increases to obtain a plurality of shape difference evaluated values; a second calculation unit configured to calculate a minimum shape difference evaluated value of the shape difference evaluated values and a new second shape data element corresponding to the minimum shape difference evaluated value; a comparison unit configured to compare the minimum shape difference evaluated value with a threshold; and a third calculation unit configured to calculate a difference shape data element representing a difference shape between a shape based on the first shape data element and a shape based on the new second shape data element if the minimum shape difference evaluated value is not more than the threshold, wherein if the minimum shape difference evaluated value is more than the threshold, the first storage unit stores the first shape data element as structured vector graphics shape data, and if the minimum shape difference evaluated value is not more than the threshold, the first storage unit stores the difference shape data element as structured vector graphics shape data.

In accordance with a second aspect of the invention, there is provided a vector graphics shape rendering apparatus comprising: a first acquisition unit configured to acquire, from a data source, a shape number of structured vector graphics shape data obtained by processing vector graphics shape data in accordance with a specific format; a storage unit configured to store a plurality of sets of structured vector graphics shape data and a shape number corresponding to the structured vector graphics shape data; a read unit configured to read structured vector graphics shape data corresponding to the acquired shape number from the storage unit; a reconstruction unit configured to reconstruct a vector graphics shape corresponding to the read structured vector graphics shape data; a preprocessing unit configured to execute a preprocess including a conversion process of a definition order of vertices of the reconstructed vector graphics shape and a process of converting vertex coordinates into coordinates before scaling; a second acquisition unit configured to acquire a rendering parameter as a numerical value to determine a rendering format; a rendering unit configured to render preprocessed vector graphics shape on the basis of the rendering parameter; and a presentation unit configured to present the rendered vector graphics shape as image data.

BRIEF DESCRIPTION OF THE SEVERAL VIEWS OF THE DRAWING

FIG. 4 is a view showing an example of structured vector graphics shape data;

FIG. 11 is a flowchart showing an example of the operation of a shape search process control unit 106 in FIG. 1;

FIG. 13 is a view showing an example of an outline font shape;

FIG. 14 is a view showing an example of outline font shape data;

FIG. 15 is a view showing an example of outline font contour information data according to the second embodiment;

FIG. 17 is a view showing an example of outline font contour information data according to the third embodiment;

DETAILED DESCRIPTION OF THE INVENTION

Figure 1:
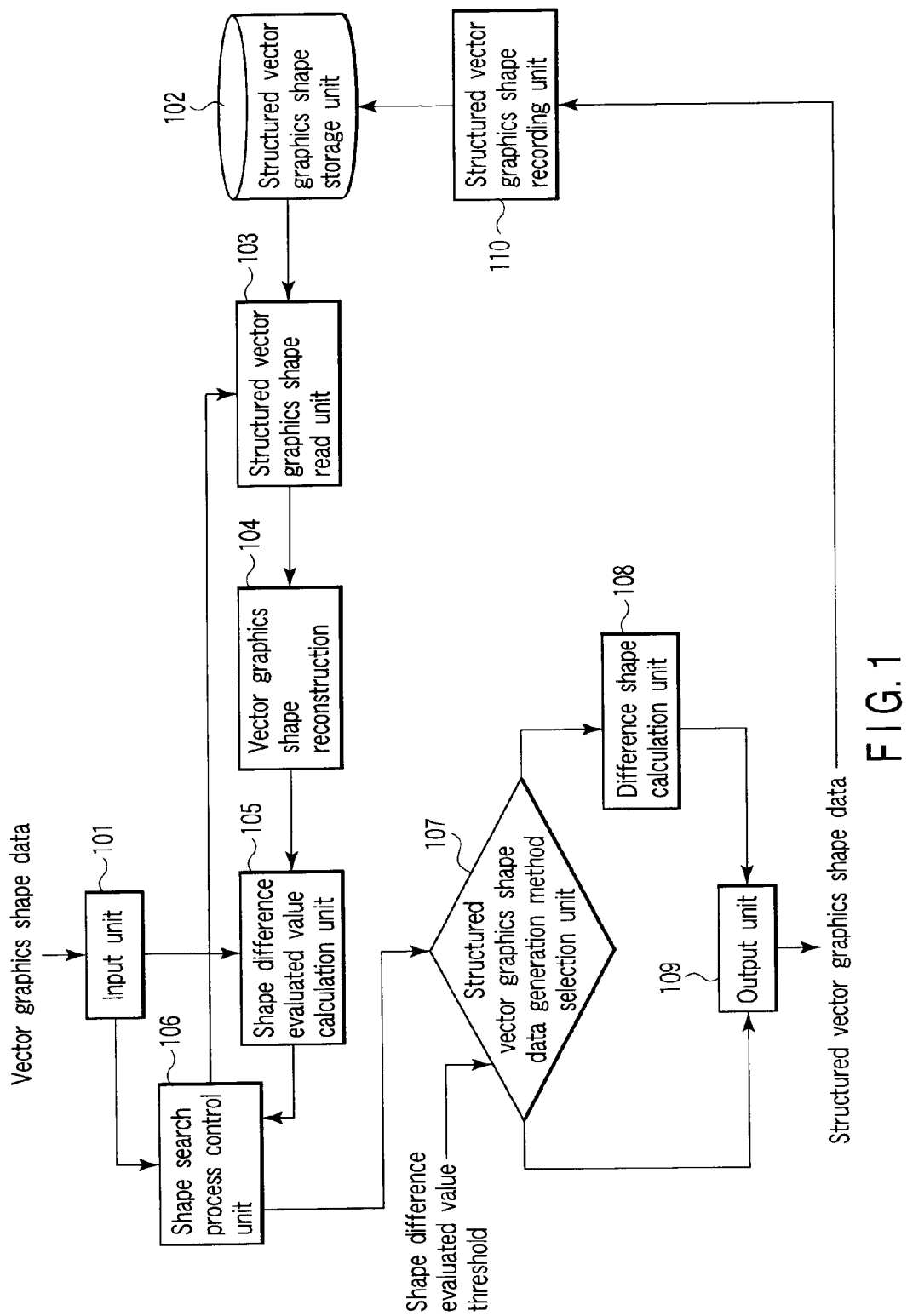
FIG. 1 is a block diagram of a vector graphics shape data generation apparatus according to the first embodiment.

A vector graphics shape data generation apparatus, rendering apparatus, method, and program according to the embodiments of the present invention will be described below in detail with reference to the accompanying drawing.

The outline of the embodiments will be described first briefly.

There exists a technique of efficiently rendering high-quality vector graphics and outline fonts whose contours are defined by curves in CG images by using a pixel shader installed in a GPU serving as a graphics LSI (e.g., C. Loop and J. Blinn, "Resolution Independent Curve Rendering using Programmable Graphics Hardware", In Proc. of ACM SIGGRAPH2005, pp. 1000 1009). To make the GPU render an outline font at high speed on the basis of this technique, the shape information of characters must be arranged on a video memory. In displaying a Japanese text, the shape data of kanji characters each having many strokes and many character types consumes the video memory.

In the embodiments, taking note of the fact that identical characters of different font types (e.g., Kaku-Gothic font and Maru-Gothic font) have similar character shapes, and kanji characters with a common radical have similar radical shapes, a vector graphics shape data generation apparatus for generating a vector graphics shape data structure including reference information and difference information will be described. In the embodiments, a rendering apparatus based on structured vector graphics shape data will be described. These apparatuses reduce video memory consumption in displaying Japanese texts by using a GPU. Hence, it is possible to quickly display a wider variety of fonts and improve the expression power of an interactive application.

More specifically, assume that two outline shapes with similar shapes exist, and the distance between a vertex coordinate of one shape and that of the other shape is much smaller than the size of the whole outline shapes. In this case, the vector graphics shape data generation apparatus of the embodiments holds the distance as difference shape information between the shapes. Difference shape information can express a shape sufficiently accurately by an information amount smaller than the original outline shape.

The vector graphics shape data generation apparatus of the embodiments includes means for calculating the above-described difference shape information, and means for storing the original shape information and the difference shape information, taking note of the similarity between partial shapes (left-hand radicals or right-hand radicals) of kanji characters and the similarity in shape between identical characters of different font types. The vector graphics shape data generation apparatus of the embodiments includes means for efficiently rendering outline font shape information stored by a technique to be described in the embodiments of the present invention by using a graphics pipeline.

The use of the technique according to the embodiments enables to reduce the video memory capacity required for storing font shape information when a graphics processor renders an outline font. This makes it possible to store character information of more kinds and font types in a video memory and also allows the video memory to store another data necessary for an application so that an interactive application with higher expression power can be obtained.

The vector graphics shape data generation apparatus and rendering apparatus according to the embodiments are expected to be installed in a next generation graphics processing engine or middleware that uses outline font data to display characters.

First Embodiment

In the first embodiment, an example of an apparatus that receives vector graphics shape data and a shape similarity threshold and generates structured vector graphics shape data will be described.

The vector graphics shape data generation apparatus according to the first embodiment will be described with reference to FIG. 1.

As shown in FIG. 1, the vector graphics shape data generation apparatus of this embodiment includes an input unit 101, structured vector graphics shape storage unit 102, structured vector graphics shape read unit 103, vector graphics shape reconstruction unit 104, shape difference evaluated value calculation unit 105, shape search process control unit 106, structured vector graphics shape data generation method selection unit 107, difference shape calculation unit 108, output unit 109, and structured vector graphics shape recording unit 110.

The input unit 101 receives vector graphics shape data from a data source and notifies the shape search process control unit 106 of the reception of the vector graphics shape data. The vector graphics shape data will be described later with reference to FIG. 3. The vector graphics shape of the vector graphics shape data will be described later with reference to FIG. 2.

The structured vector graphics shape storage unit 102 stores structured vector graphics shape data. The structured vector graphics shape data will be described later with reference to FIG. 4.

The structured vector graphics shape read unit 103 receives a shape number to specify structured vector graphics shape data and reads one structured vector graphics shape data from the structured vector graphics shape storage unit 102 on the basis of the shape number.

The vector graphics shape reconstruction unit 104 reconstructs vector graphics shape data from the structured vector graphics shape data read by the structured vector graphics shape read unit 103 on the basis of the shape number to specify the structured vector graphics shape data. The operation of the vector graphics shape reconstruction unit 104 will be described later in detail with reference to FIG. 5.

The shape difference evaluated value calculation unit 105 calculates the shape difference evaluated value between the vector graphics shape data reconstructed by the vector graphics shape reconstruction unit 104 and the vector graphics shape data input by the input unit 101. The shape difference evaluated value is an index indicating the similarity between two vector graphics shapes corresponding to two vector graphics shape data. The smaller the shape difference evaluated value is, the higher the similarity between the two vector graphics shapes is. The operation of the shape difference evaluated value calculation unit 105 will be described later in detail with reference to FIG. 6.

The shape search process control unit 106 receives the shape difference evaluated value from the shape difference evaluated value calculation unit 105. The shape search process control unit 106 temporarily stores, in a memory (not shown), the shape difference evaluated value between each structured vector graphics shape data stored in the structured vector graphics shape storage unit 102 and the vector graphics shape data input by the input unit 101. The shape search process control unit 106 transfers, of the shape difference evaluated values stored in the memory, a shape difference evaluated value (minimum value) representing a highest similarity and structured vector graphics shape data corresponding to the shape difference evaluated value to the structured vector graphics shape data generation method selection unit 107. That is, the shape search process control unit 106 searches for a shape most similar to the vector graphics shape data input by the input unit 101 from the vector graphics shapes reconstructed from all structured vector graphics shape data stored in the structured vector graphics shape storage unit 102.

The structured vector graphics shape data generation method selection unit 107 compares the shape difference evaluated value found by the shape search process control unit 106 and representing the most similar vector graphics shape with a preset shape difference evaluated value threshold and selects, on the basis of the comparison result, the data generation method of the vector graphics shape data input by the input unit 101. The shape difference evaluated value threshold may be externally input by the user via the input unit 101 and the like or set in each vector graphics shape data generation apparatus in advance.

The difference shape calculation unit 108 receives the structured vector graphics shape data (one of the shape data stored in the structured vector graphics shape storage unit 102) corresponding to the shape difference evaluated value calculated by the shape search process control unit 106 and the vector graphics shape data input by the input unit 101 and calculates difference shape data about the vector graphics shape input by the input unit 101. An example of the difference shape data will be described later with reference to FIG. 4.

The output unit 109 outputs, as structured vector graphics shape data, the vector graphics shape data input by the input unit 101 or the difference shape data calculated by the difference shape calculation unit 108.

The structured vector graphics shape recording unit 110 records, in the structured vector graphics shape storage unit 102, the structured vector graphics shape data output from the output unit 109.

[Vector Graphics Shape]

Figures 2, 3:
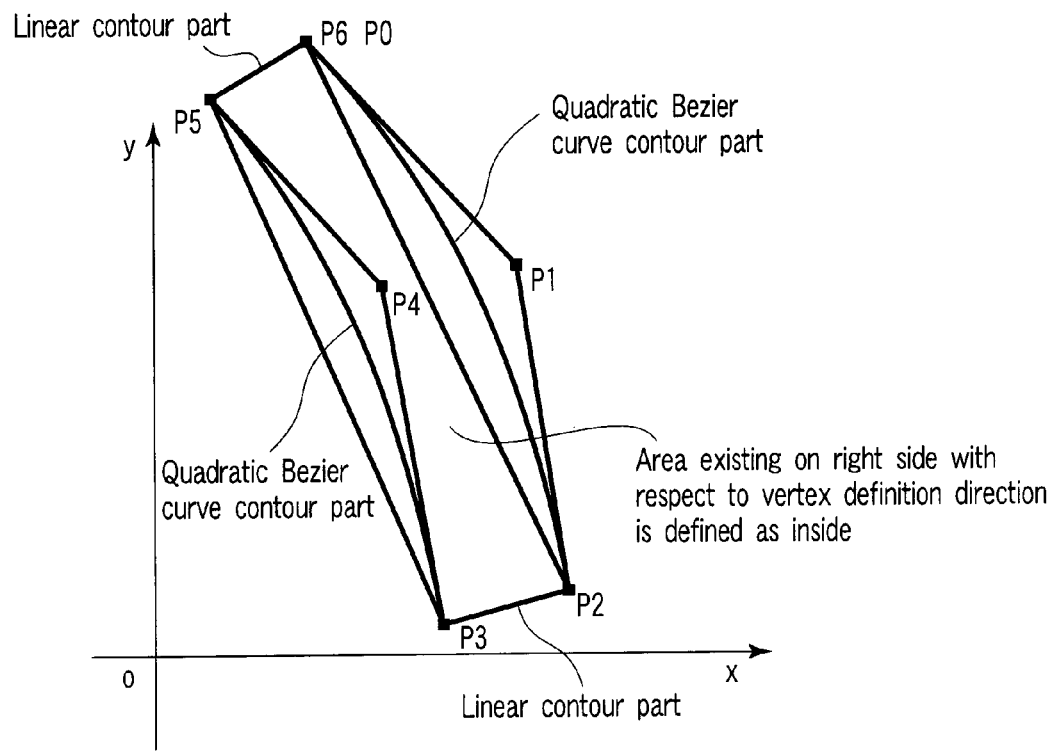
FIG. 2 is a view showing an example of a vector graphics shape.
FIG. 3 is a view showing an example of vector graphics shape data.

The vector graphics shape will be described next with reference to FIG. 2. FIG. 2 shows an example of a vector graphics shape indicated by vector graphics shape data input by the input unit 101.

The vector graphics shape indicated by the vector graphics shape data input by the input unit 101 has, as a element, the contour of one closed curve formed by connecting line segments or quadratic Bezier curves. A line segment is defined by two vertices of two end points. A curve is defined by three vertices (e.g., P0, P1, and P2) serving as quadratic Bezier control points. An area that exists on the right side with respect to the definition direction (clockwise direction in FIG. 2) of the vertices of the vector graphics shape, i.e., an area surrounded by the closed curve of the quadratic Bezier curve contour in FIG. 2 will be defined as the inside of the vector graphics shape.

[Vector Graphics Shape Data]

An example of the contents of the vector graphics shape data input by the input unit 101 will be described next with reference to FIG. 3. FIG. 3 shows the data structure of the vector graphics shape input to the input unit 101 shown in FIG. 2.

Shape data starts with an "outline start symbol" and then defines the coordinate values of the vertex P0 serving as a starting point. The coordinate values are expressed by two-dimensional coordinates with elements (x,y). Next, a "quadratic Bezier curve symbol" is defined to represent a quadratic Bezier curve having the vertices P0, P1, and P2 as control points so that the coordinate values of the vertices P1 and P2 are defined. A "line segment symbol" is defined to indicate a line segment from the vertex P2 to a vertex P3 so that the coordinate values of the vertex P3 serving as the end point of the line segment are defined. Vertices included in a contour line and information about the straight or curved line connecting the vertices are sequentially defined in this way. Finally, when a vertex P6=P0 as the starting point of the contour line is defined, an "outline end symbol" is defined to indicate the end of the contour line.

[Structured Vector Graphics Shape Data]

The structured vector graphics shape data stored in, e.g., the structured vector graphics shape storage unit 102 will be described next with reference to FIG. 4. FIG. 4 shows the structure of the structured vector graphics shape data.

Structured vector graphics shape data has a data structure that defines vector graphics shape data conforming to a format to be described below. In other words, structured vector graphics shape data is obtained by processing vector graphics shape data conforming to a specific format.

Structured vector graphics shape data 401 shown on the left of FIG. 4 defines a shape by one structured vector graphics shape data. The internal data structure will be described below. First, a "shape number S" to specify a shape is defined. Next, a "vertex rotation direction C" is defined to indicate whether to reverse the definition direction of vertices. Structured vector graphics shape data defines vertices clockwise. If vector graphics shape data have vertices defined counterclockwise, information representing that the vertex definition order is reversed is held in the "vertex rotation direction C". Next, a "scaling coordinate value K" is defined. The structured vector graphics shape data is scaled so that the vertex coordinate definition range is defined by 0≦x, y≦1. For this reason, the definition range of the vertices of vector graphics before scaling is held in the "scaling coordinate value K". The structure from the "outline start symbol" to the "outline end symbol" is the same as in FIG. 2.

Structured vector graphics shape data 402 shown on the right of FIG. 4 defines a shape by the difference from structured vector graphics shape data serving as a reference shape. That is, the structured vector graphics shape data 402 is the above-described difference shape data. For example, the difference shape calculation unit 108 calculates the structured vector graphics shape data 402. The internal data structure will be described below. First, the "shape number S" has the same function as in the structured vector graphics shape data 401. A "reference shape number R" indicates the number of structured vector graphics shape data serving as a reference. The "vertex rotation direction C" and "scaling coordinate value K" have the same functions as in the structured vector graphics shape data 401. The vertex definition method from the "outline start symbol" to the "outline end symbol" is different from the structured vector graphics shape data 401. Vertex coordinates P'0 defined as "reference vertex number N0, relative coordinate V0" are calculated in the following way. The "reference vertex number N0" indicates the N0th vertex in the structured vector graphics shape data designated by the reference shape number R. The "relative coordinate V0" indicates the existence of the vertex P'0 at V0 relative to the coordinates of the N0th vertex. The functions of the "outline start symbol", "line segment symbol", "quadratic Bezier curve symbol", and "outline end symbol" except the vertex coordinate definition method are the same in the structured vector graphics shape data 401.

[Reconstruction from Structured Vector Graphics Shape Data to Vector Graphics Shape]

Figure 5:
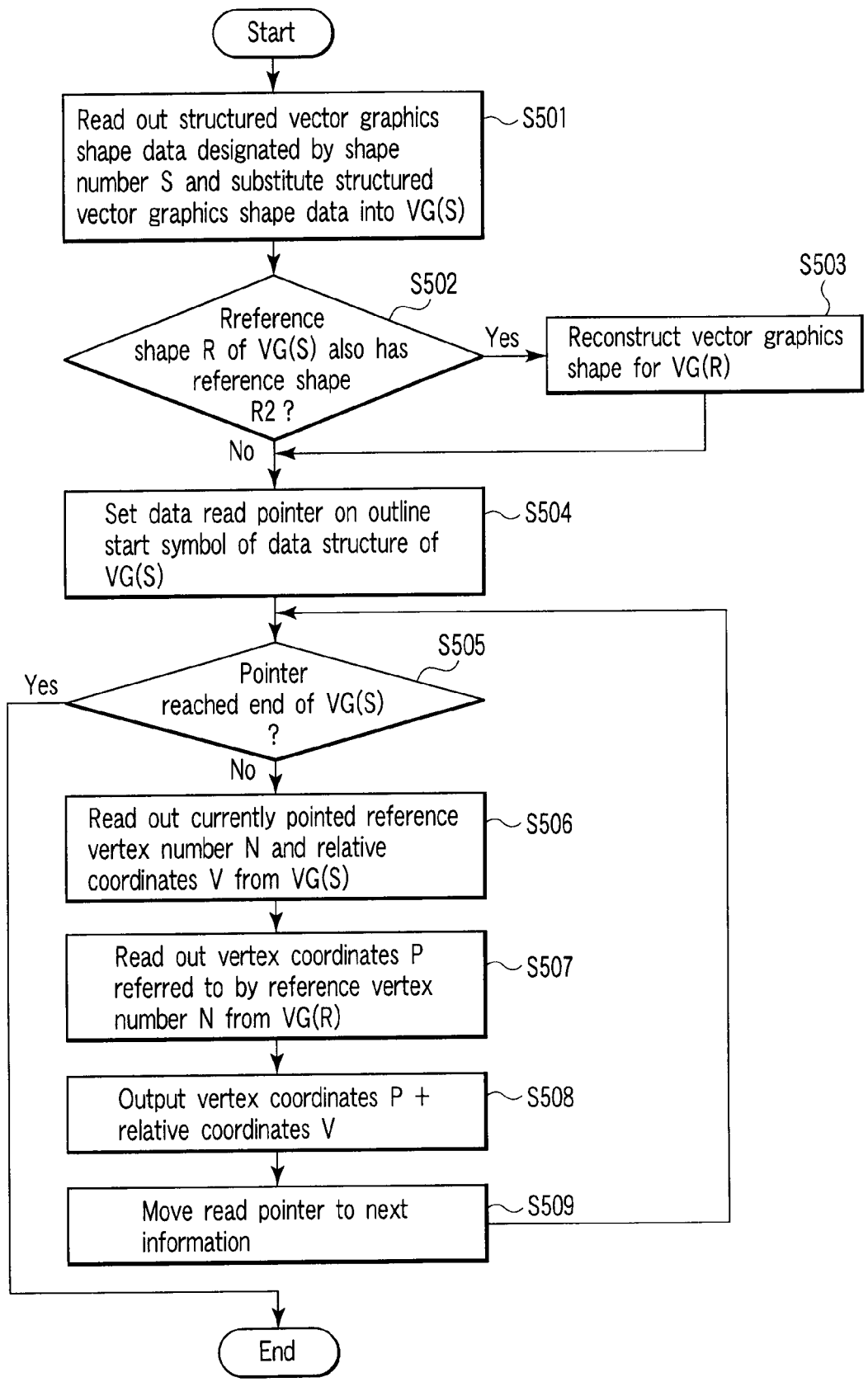
FIG. 5 is a flowchart showing an example of the operation of a vector graphics shape reconstruction unit in FIG. 1.

An example of the operation of the vector graphics shape reconstruction unit 104 will be described next with reference to FIG. 5. FIG. 5 is a flowchart showing a process implemented by the vector graphics shape reconstruction unit 104. The structured vector graphics shape read unit 103 reads structured vector graphics shape data with a designated shape number from the structured vector graphics shape storage unit 102 and transfers it to the vector graphics shape reconstruction unit 104.

The structured vector graphics shape data designated by the shape number S is reconstructed first. The structured vector graphics shape data with the shape number S is loaded and substituted into a memory area VG(S) (step S501). VG(S) indicates structured vector graphics shape data with the shape number S. It is confirmed whether the shape defined by the reference shape number R defined in VG(S) further has a reference shape R2 (step S502). If R has the reference shape R2, i.e., VG(R) is data with the format of the structured vector graphics shape data 402, the shape reconstruction process shown in FIG. 5 is executed recursively for VG(R) (step S503). If R is data with the format of the structured vector graphics shape data 401, a data read pointer is set in the outline start symbol in the data structure to sequentially read the data VG(S) (step S504).

As a termination process of the read loop of the data structure of VG(S), it is confirmed whether the read pointer has reached the end of VG(S) (step S505). If the read pointer has not reached the end of VG(S) yet, a currently pointed reference vertex number N and relative coordinates V are read from VG(S) (step S506). Vertex coordinates P referred to by the reference vertex number N are read from VG(S) (step S507). The vertex coordinates P+relative coordinates V are output (step S508). The read pointer advances to the next information (step S509). If the read pointer has reached the end of the data structure in step S505, the shape reconstruction process is ended.

[Comparison of Vector Graphics Shapes]

Figure 6:
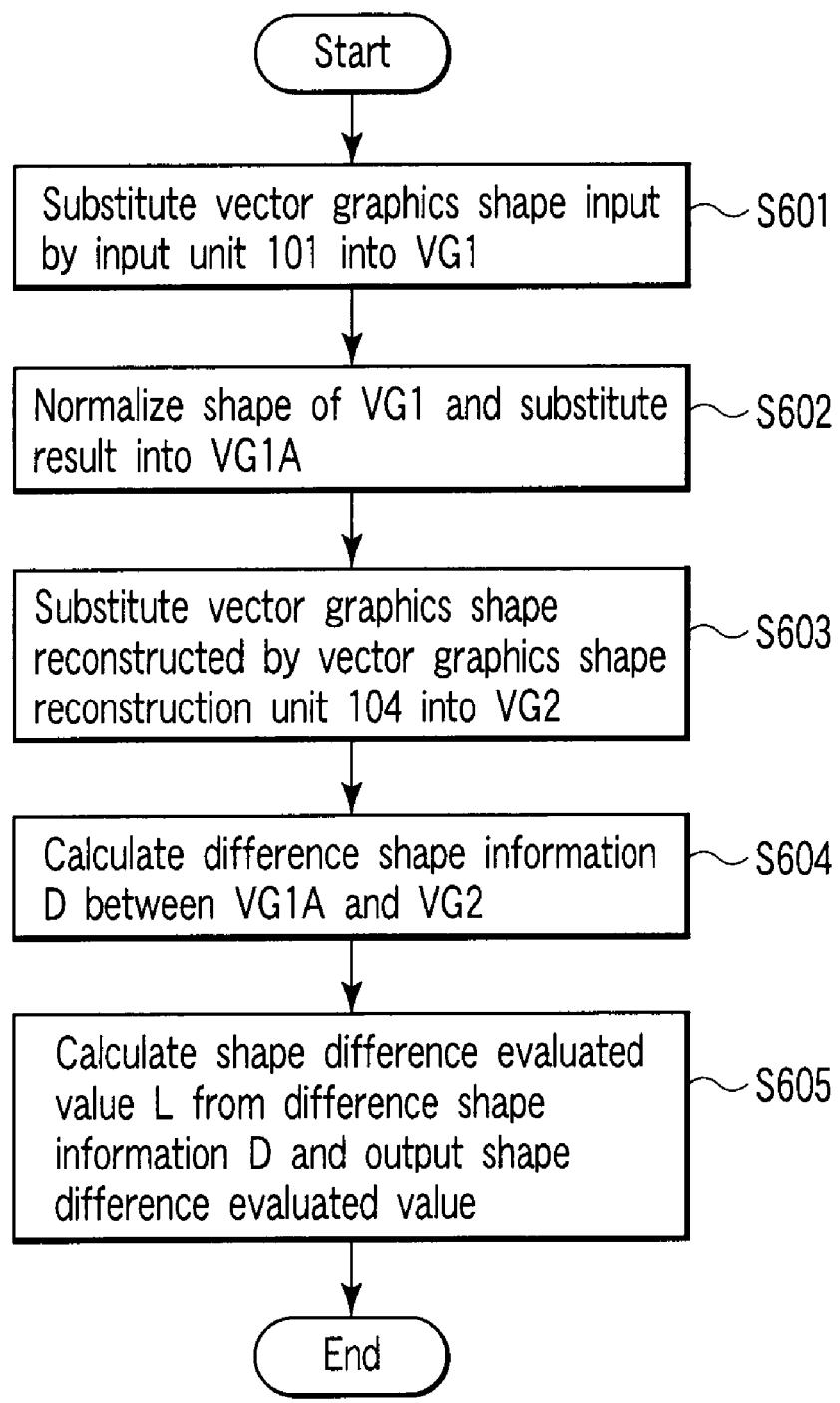
FIG. 6 is a flowchart showing an example of the operation of a shape difference evaluated value calculation unit in FIG. 1.

An example of the operation of the shape difference evaluated value calculation unit 105 will be described next with reference to FIG. 6.

Vector graphics shape data input by the input unit 101 is substituted into VG1 (step S601). A shape normalization process of VG1 is executed, and the process result is substituted into VG1A (step S602). The shape normalization process will be described later with reference to FIG. 7. Next, the vector graphics shape reconstructed by the vector graphics shape reconstruction unit 104 is substituted into VG2 (step S603). Difference shape information D between VG1A and VG2 is calculated (step S604). A shape difference evaluated value L is calculated from the difference shape information D and output (step S605). The processes in steps S604 and S605 will be described later with reference to FIGS. 8, 9, and 10.

The shape normalization process executed in step S602 of FIG. 6 will be described next with reference to FIG. 7.

If the vertex definition direction of the vector graphics shape VG1A is counterclockwise, the vertex definition direction is redefined to clockwise (step S701). The coordinates of all vertices Pi(Xi,Yi) (0≦i≦n) are examined. A minimum value Xmin and maximum value Xmax of X-coordinates and a minimum value Ymin and maximum value Ymax of Y-coordinates are obtained (step S702). All vertices are subjected to coordinate conversion by $$Xai=(Xi-X\mathrm{min})/(X\mathrm{max}-X\mathrm{min}),$$

$$Yai=(Yi-Y\mathrm{min})/(Y\mathrm{max}-Y\mathrm{min})$$

A vertex converted by this scaling is defined as a vertex Pai(Xai,Yai) (0≦i≦n) (step S703). With the process in steps S702 and S703, the coordinate values of the vector graphics shape are converted so as to fall within the range of 0 to 1. For all vertices Pai(Xai,Yai), an index that gives the vertex Pai with minimum (Xai+Yai) including minimum Yai is defined as j (step S704). A vertex Pbk (0≦k≦n) is defined such that a vertex Paj=Pb0, and Pa(j+1)=Pb1. The newly defined vector graphics shape data is substituted into VG1A (step S705). With the process in steps S704 and S705, the vertex definition order is converted such that the vertex starts from the upper left point of the vector graphics shape.

Figure 8:
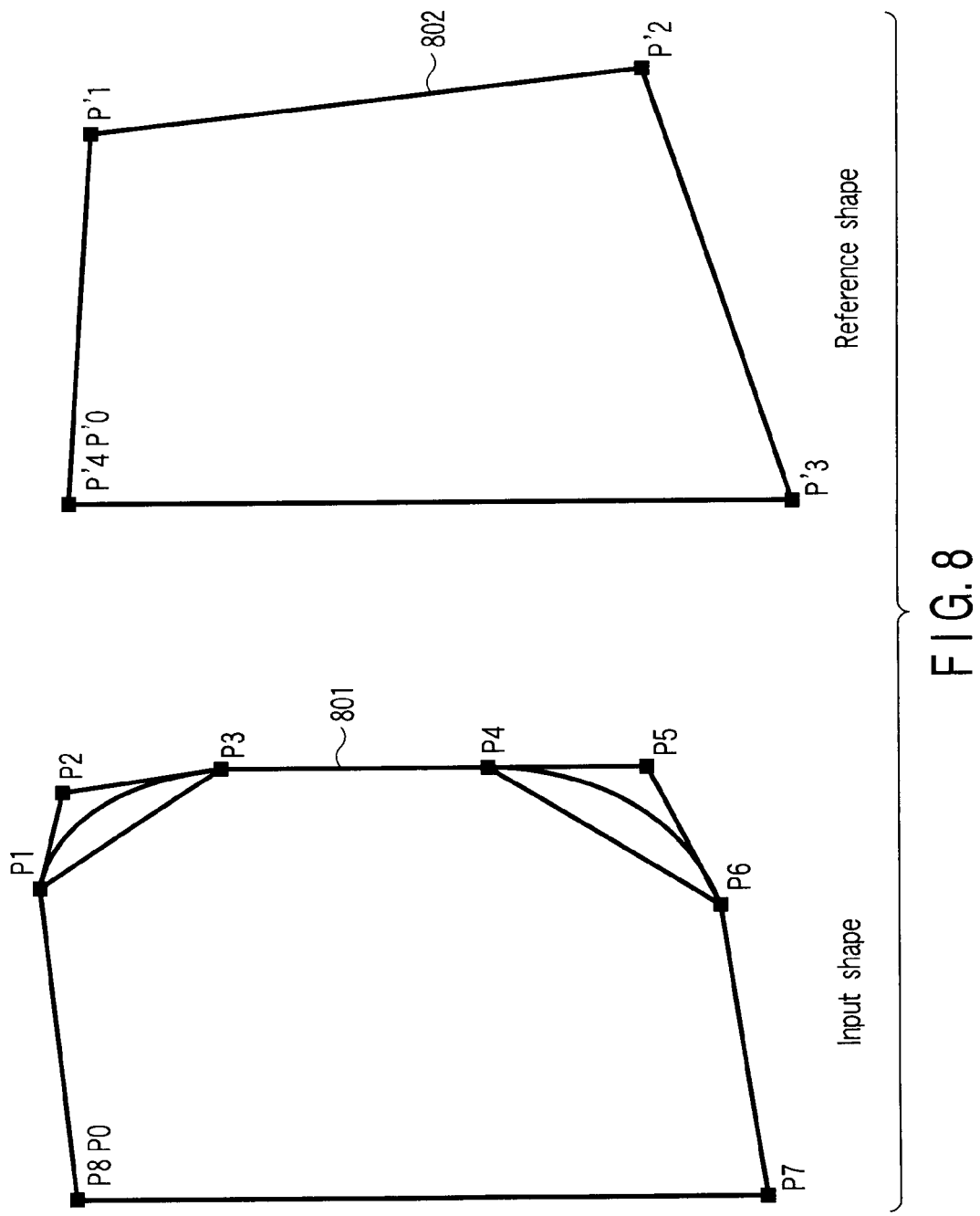
FIG. 8 is a view showing an example of the input shape of a vector graphics shape and an example of a reference shape.
Figure 9:
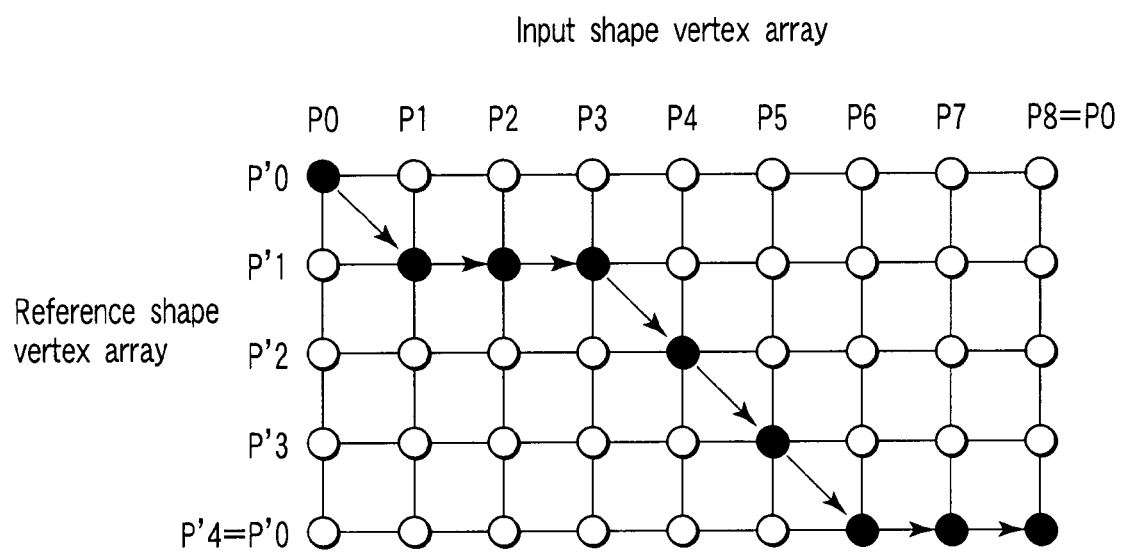
FIG. 9 is a view showing DP matching corresponding to the input shape and reference shape in FIG. 8.
Figure 10:
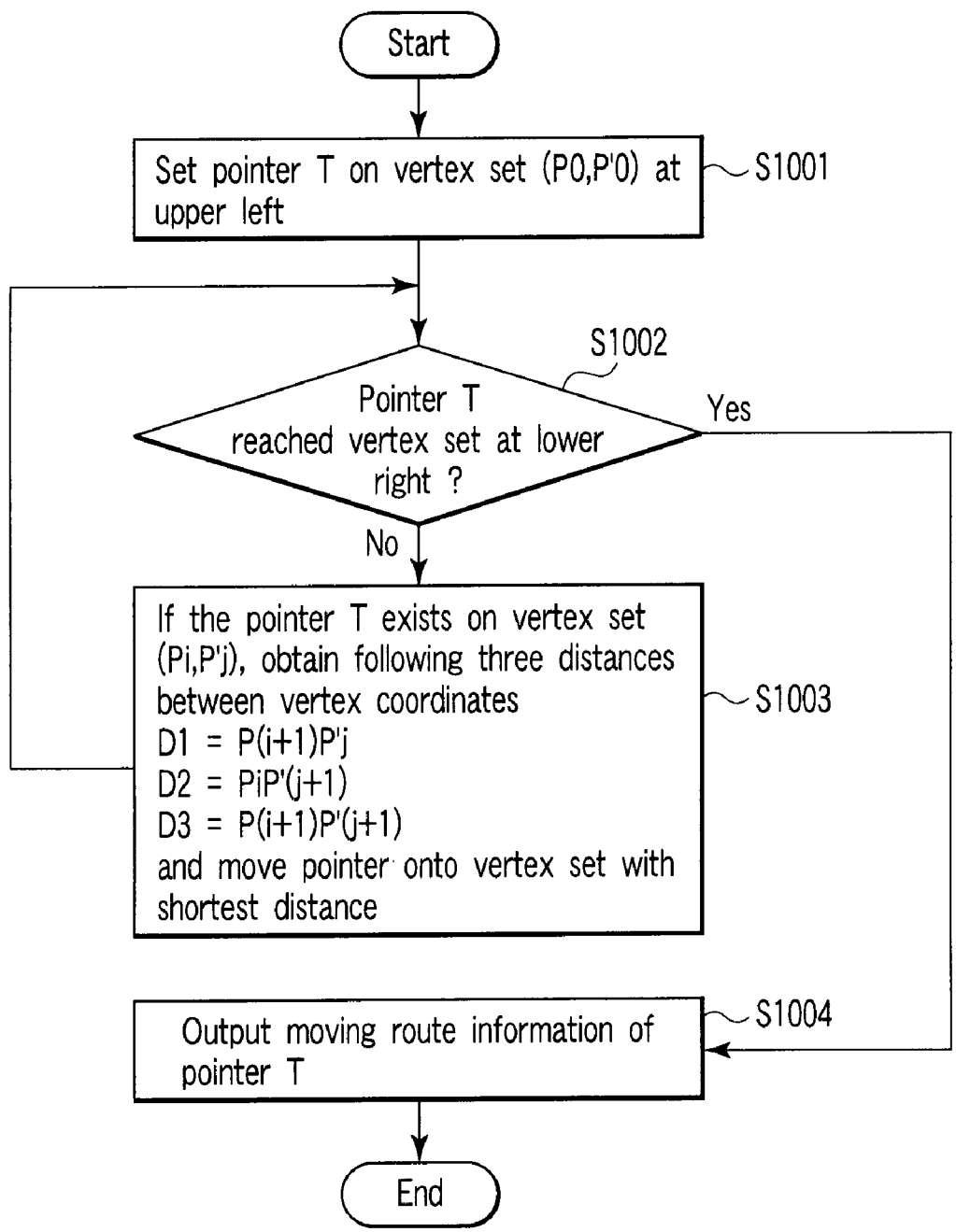
FIG. 10 is a flowchart showing an example of a DP matching process.

The process of calculating the difference shape information D in step S604 will be described next with reference to FIGS. 8, 9, and 10.

In two vector graphics shapes, a vertex of one shape and the nearest vertex of the other shape are made to correspond to each other without changing the vertex definition order. The distance between the two vertices is obtained as difference shape information. Two vector graphics shapes shown in FIG. 8 will be exemplified. The shape indicated by an input shape 801 is the input and normalized shape VG1A. The shape indicated by a reference shape 802 is the reference shape VG2. Since the shapes shown in FIG. 8 are simple, it can be seen that the vertex P0 corresponds to the vertex P'0, and a vertex P5 corresponds to a vertex P'2.

The process of obtaining difference shape information will be described below. For each vertex of the input shape 801, the nearest vertex of the reference shape 802 is calculated. A known technique called DP matching is applied to this. An array expressed by a matrix of a reference shape vertex array (P'0 to P'4) and an input shape vertex array (P0 to P8) is defined as shown in FIG. 9. Then, the process shown in FIG. 10 is performed. A pointer T is set on the vertex set (P0, P'0) at the upper left corner in FIG. 9 (step S1001). It is confirmed whether the pointer T has reached the vertex set at the lower right corner (step S1002). If the pointer T has not reached there, i.e., the pointer T is located on a vertex set (Pi, P'j), the following three distances between vertex coordinates are obtained, and the pointer is moved onto the vertex set with the shortest distance (step S1003).

$$D1 = P(i+1)P'j$$

$$D2 = PiP'(j+1)$$

$$D3 = P(i+1)P'(j+1)$$

If the pointer T has reached the vertex set at the lower right corner in step S1002, the moving route information of the pointer T is output (step S1004). The filled circles and arrows in FIG. 9 indicate a result obtained by executing the process in FIG. 10 for the shapes in FIG. 8. In this way, the vertices on the reference shape 802, which are nearest to the corresponding vertices of the input shape 801 in FIG. 8, are determined.

In step S605, the shape difference evaluated value L is obtained from the difference shape information D obtained by the above-described process. The shape difference evaluated value is defined as the average of the distances between corresponding vertices. Let P(i) (0≦i<n) be a vertex of the input shape, and Pref(i) (0≦i<n) be a vertex of the reference shape corresponding to P(i). Then, the shape difference evaluated value L is given by $$L = (\Sigma(i=0, \ldots, n-1)|P(i) - Pref(i)|)/n$$

<Method of Obtaining Shape Difference Evaluated Value Based on Area of Overlap Region Between Input Shape and Reference Shape>

In the process in step S605, the area of the overlap region between the input shape and reference shape may be used as the shape difference evaluated value in place of the average value of the distances between corresponding vertices of the input shape and the reference shape.

[Search of Vector Graphics Shape]

An example of the operation of the shape search process control unit 106 in FIG. 1 will be described next with reference to FIG. 11.

An initial value is substituted into a value LM that stores the shape difference evaluated value during the search process (step S1101). In this embodiment, the smaller the shape difference evaluated value is, the higher the similarity is. Hence, the initial value of LM is set to ∞. An initial value is substituted into an index number F to specify structured vector graphics shape data on the structured vector graphics shape storage unit 102 (step S1102). It is determined for all structured vector graphics shape data on the structured vector graphics shape storage unit 102 whether a shape difference evaluated value is calculated (step S1103). If a shape difference evaluated value has not been calculated for all data, the vector graphics shape reconstruction unit 104 obtains a vector graphics shape VG(F) for shape data specified by the current index number F (step S1104). The shape difference evaluated value calculation unit 105 obtains a shape difference evaluated value L(F) for VG(F) (step S1105). The magnitudes of the values L(F) and LM are compared (step S1106). If L(F) <LM, L(F) is substituted into LM (step S1107). The index F is incremented by one to examine the next shape on the structured vector graphics shape storage unit 102 (step S1108). If evaluation has been done for all vector graphics shapes on the structured vector graphics shape storage unit 102, the minimum value LM of the shape difference evaluated value and F and VG(F) that give LM are output (step S1109).

<Method of Designating Upper Limit Value of Reference Count>

Suppressing a process time required for the shape reconstruction process by setting an upper limit value of the count of shape reference by the vector graphics shape reconstruction unit 104 will be described next.

Regarding structured vector graphics shape data that expresses a certain shape, if structured vector graphics shape data with a format containing a reference shape number indicated by 402 in FIG. 4 is referred to many times, the number of times of recursive processes in the shape reconstruction process shown in FIG. 5 increases, resulting in an increase in the process time required for the shape reconstruction process.

To prevent any increase in the process time required for the shape reconstruction process, an upper limit value RM of the reference count is input to the shape search process control unit 106. In vector graphics shape reconstruction process by the vector graphics shape reconstruction unit 104, if the reference count of the shape is equal to or larger than RM, shape reconstruction is not executed so that the shape is excluded from the comparison target in the shape difference evaluated value calculation process by the shape difference evaluated value calculation unit 105. Any shape whose reference count is equal to or more than the upper limit value cannot be a reference shape. It is therefore possible to suppress the reference count of structured vector graphics shape data within a predetermined value.

[Selection of Structured Vector Graphics Shape Data Generation Method and Output of Data]

Selection of the structured vector graphics shape data generation method and output of structured vector graphics shape data will be described next.

The structured vector graphics shape data generation method selection unit 107 compares a received shape difference evaluated value threshold LT with the shape difference evaluated value LM obtained by the shape search process control unit 106 as the difference from the structured vector graphics shape that is stored in the structured vector graphics shape storage unit 102 and is most similar to the vector graphics shape input by the input unit 101.

If LT<LM, the structured vector graphics shape storage unit 102 stores no shape sufficiently similar to the input shape. The output unit 109 outputs the input shape having the data structure 401 in FIG. 4. If LT≧LM, the difference shape calculation unit 108 obtains the difference shape information D. The output unit 109 outputs the difference shape information D having the data structure 402 in FIG. 4. The difference shape calculation process of the difference shape calculation unit 108 is the same as the process in step S604.

Finally, the structured vector graphics shape recording unit 110 stores, in the structured vector graphics shape storage unit 102, the structured vector graphics shape data output from the output unit 109.

<Method of Designating Maximum Value of Distance Between Corresponding Vertices>

A method of designating the maximum value of the distance between corresponding vertices when the shape difference evaluated value calculation unit 105 uses, as the shape difference evaluated value, the average value of the distances between corresponding vertices of the input shape and the reference shape in step S605 will be described.

In the above example, the shape difference evaluated value L in step S605 is defined as the average of the distances between corresponding vertex sets. If only the distance between certain vertices is very long, it may be impossible to sufficiently accurately express the relative coordinates of the vertices even when the shape difference evaluated value L is sufficiently small.

To prevent this, a process may be added in which a maximum value DMax of the distance between corresponding vertices is input to the shape difference evaluated value calculation unit 105, and if at least one of the distances between corresponding vertices exceeds DMax, the shape is excluded from the comparison target in the shape difference evaluated value calculation process by the shape difference evaluated value calculation unit 105. With this process, the distances between corresponding vertices always fall within DMax. Hence, a numerical format capable of sufficiently accurately expressing the distance within the distance DMax can be used as the numerical format of relative distances.

{Effect of First Embodiment}

As the shape difference between the input shape and the reference shape decreases, the relative coordinate value (two-dimensional vector) in the structured vector graphics shape data generated by the difference shape calculation unit 108 decreases with respect to the length (1) of one side of an area defined by the vertices of the vector graphics. By setting the shape difference evaluated value threshold LT to an appropriate value, the vector graphics shape can be expressed sufficiently accurately even when, for example, the relative coordinate values of the structured vector graphics shape data 402 are expressed by 16-bit floating points, although the vertex coordinate values in the data structure of the structured vector graphics shape data 401 are expressed by 32-bit floating points.

When a number of similar vector graphics shapes are present, they are stored by employing the data structure of the structured vector graphics shape data 402. This suppresses the size of the data area necessary for storage.

Second Embodiment

In the second embodiment, an example of an apparatus that receives outline font data and a shape similarity threshold and records structured vector graphics shape data and the contour information of the outline font data will be described.

Figure 12:
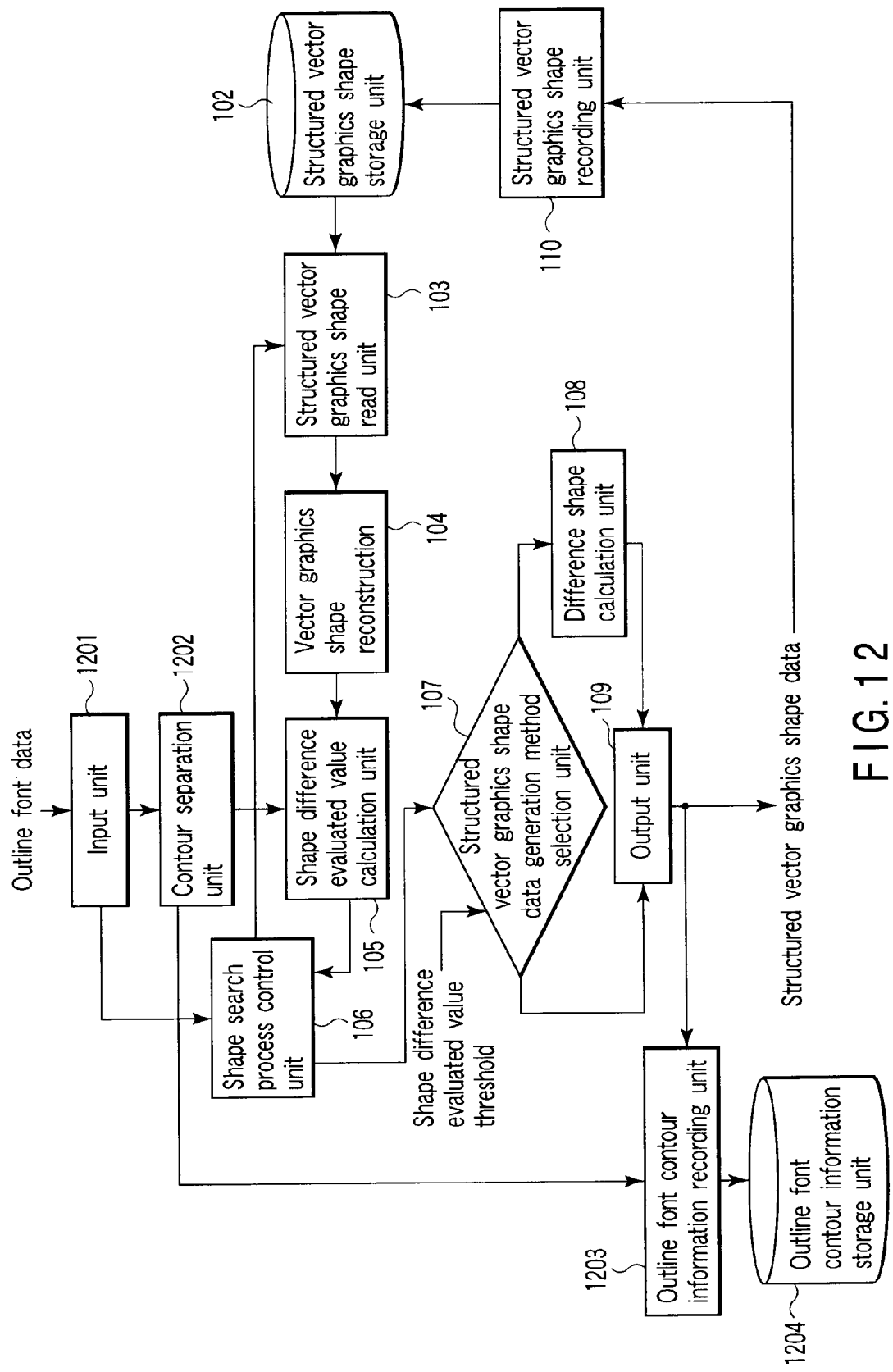
FIG. 12 is a block diagram of a vector graphics shape data generation apparatus according to the second embodiment.

The vector graphics shape data generation apparatus according to the second embodiment will be described with reference to FIG. 12. The same reference numerals as in the already described apparatus denote the same parts, and a description thereof will be omitted.

The vector graphics shape data generation apparatus of this embodiment includes an input unit 1201, contour separation unit 1202, outline font contour information recording unit 1203, outline font contour information storage unit 1204, structured vector graphics shape storage unit 102, structured vector graphics shape read unit 103, vector graphics shape reconstruction unit 104, shape difference evaluated value calculation unit 105, shape search process control unit 106, structured vector graphics shape data generation method selection unit 107, difference shape calculation unit 108, and output unit 109.

The input unit 1201 receives outline font data from a data source and notifies the shape search process control unit 106 of the reception of the outline font data. The outline font shape will be described later with reference to FIG. 13.

The contour separation unit 1202 separates the outline font data input by the input unit 1201 into contours. The contour separation unit 1202 outputs data (contour information) contained in one separated contour to the shape difference evaluated value calculation unit 105. The contour information corresponds to vector graphics shape data. The contour separation unit 1202 also outputs the shape number and contour number to the outline font contour information recording unit 1203. The outline font data input by the input unit 1201 is separated into contours in the outline font data by the contour separation unit 1202 and input to the shape difference evaluated value calculation unit 105. The contour separation unit 1202 also transfers the serial number of the contour in the outline font to the outline font contour information recording unit 1203 to associate structured vector graphics shape data of one contour output from the output unit 109 in FIG. 12 with contour information in the outline font data input by the input unit 1201.

The outline font contour information recording unit 1203 records, in the outline font contour information storage unit 1204, the information that associates the contour information output from the contour separation unit 1202 with the structured vector graphics shape data output from the output unit 109. The outline font contour information recording unit 1203 associates the serial number of the contour with the structured vector graphics shape data output from the output unit 109 and records them in the outline font contour information storage unit 1204.

The outline font contour information storage unit 1204 stores the information that associates the contour information with the structured vector graphics shape data.

An example of the outline font shape will be described next with reference to FIG. 13. FIG. 13 shows an example of the outline font shape input to the input unit 1201. The outline font shape input to the input unit 1201 includes a plurality of vector graphics shapes.

An example of the contents of the outline font shape data shown in FIG. 13 will be described next with reference to FIG. 14. FIG. 14 shows the data structure of the outline font shape shown in FIG. 13, which is input to the input unit 1201. The outline font data can hold a plurality of pieces of information from the "outline start symbol" to the "outline end symbol" in the vector graphics shape shown in FIG. 3.

The contents of outline font contour information will be described next with reference to FIG. 15. FIG. 15 shows the data structure of the outline contour information. In the outline contour information, the contour serial number of each contour of the outline font and the shape number of corresponding structured vector graphics shape data are defined.

{Effect of Second Embodiment}

Generally, an outline font shape includes a plurality of contours. In the first embodiment, the process target is a vector graphics shape having a single contour. In the second embodiment, the process target of the vector graphics shape data generation apparatus of the first embodiment can be expanded to outline font data by separating an outline font shape including a plurality of contours into the contours.

Third Embodiment

In the third embodiment, an example of an apparatus that receives font type information representing Mincho, Maru-Gothic, bold, or italic, a character code, and a shape similarity threshold and records structured vector graphics shape data and the contour information of the outline font data will be described.

The vector graphics shape data generation apparatus according to the third embodiment will be described with reference to FIG. 16.

Figure 16:
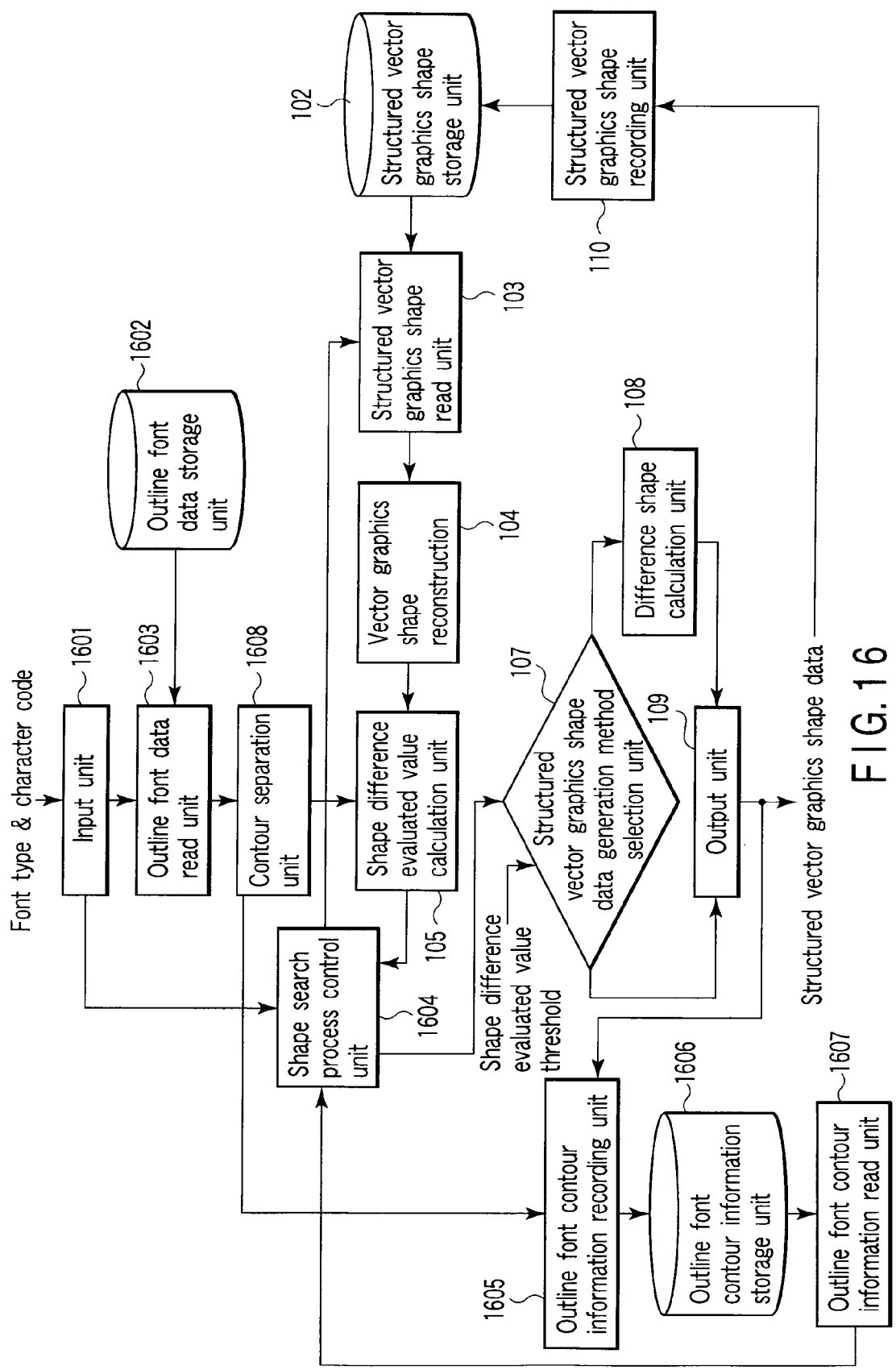
FIG. 16 is a block diagram of a vector graphics shape data generation apparatus according to the third embodiment.

As shown in FIG. 16, the vector graphics shape data generation apparatus of this embodiment includes an input unit 1601, outline font data storage unit 1602, outline font data read unit 1603, shape search process control unit 1604, outline font contour information recording unit 1605, outline font contour information storage unit 1606, outline font contour information read unit 1607, contour separation unit 1608, structured vector graphics shape storage unit 102, structured vector graphics shape read unit 103, vector graphics shape reconstruction unit 104, shape difference evaluated value calculation unit 105, structured vector graphics shape data generation method selection unit 107, difference shape calculation unit 108, output unit 109, and structured vector graphics shape recording unit 110.

The input unit 1601 receives font type information and a character code from a data source and notifies the shape search process control unit 1604 of the reception of vector graphics shape data.

The outline font data storage unit 1602 stores outline font data corresponding to the font type information and character code.

The outline font data read unit 1603 reads, from the outline font data storage unit 1602, outline font data corresponding to the font type information and character code input to the input unit 1601. The outline font data read unit 1603 transfers the read outline font data and the corresponding font type information and character code to the contour separation unit 1608.

The contour separation unit 1608 separates the outline font data received from the outline font data read unit 1603 into contours. The contour separation unit 1608 outputs data (contour information) contained in one separated contour to the shape difference evaluated value calculation unit 105. The contour information corresponds to vector graphics shape data. The contour separation unit 1608 also outputs the font type information and character code to the outline font contour information recording unit 1605.

The shape search process control unit 1604 searches for a shape most similar to the vector graphics shape data output from the contour separation unit 1608 from vector graphics shapes reconstructed from some data narrowed down as comparison candidates by using the font type information and character code from the structured vector graphics shape data stored in the structured vector graphics shape storage unit 102. The shape search process control unit 1604 obtains, from the outline font contour information read unit 1607, a set CA of outline font contour information corresponding to the font type information and character code input to the input unit 1601. For example, when a character code corresponding to Japanese character "あ" in Maru-Gothic type is input, and the outline font contour information storage unit 1606 stores the contour information of the character code corresponding to "あ" in Kaku-Gothic type in advance, the contour information of "あ" in Kaku-Gothic type is read. The shape search process control unit 1604 preferentially searches for a shape number included in the set CA of contour information.

The outline font contour information recording unit 1605 records, in the outline font contour information storage unit 1606, outline font contour information data that associates the font type information and character code output from the contour separation unit 1608 with the structured vector graphics shape data output from the output unit 109.

The outline font contour information storage unit 1606 stores the outline font contour information data that associates the font type information and character code output from the contour separation unit 1608 with the structured vector graphics shape data output from the output unit 109. The contour information data will be described later with reference to FIG. 17.

The outline font contour information read unit 1607 reads the outline font contour information corresponding to the designated font type and character code from the outline font contour information storage unit 1606.

The vector graphics shape data generation apparatus of the second embodiment receives outline font data from an external source. Unlike this, the vector graphics shape data generation apparatus of the third embodiment includes the outline font data storage unit 1602 that stores outline font data in the apparatus, and the outline font data read unit 1603 that reads, from the outline font data storage unit 1602, outline font data corresponding to a font type and character code input from the input unit 1601.

Additionally, the vector graphics shape data generation apparatus of the third embodiment adds the information of a font type and character code even to contour information stored in the outline font contour information storage unit 1606, unlike the second embodiment. FIG. 17 shows the data structure of contour information stored in the outline font contour information storage unit 1606.

{Effect of Third Embodiment}

Characters having the same character code have a high similarity even when their font types are different, e.g., "Mincho" and "Gothic". In this embodiment, the shape search process control unit 1604 preferentially searches for structured vector graphics shape data contained in the contour information of outline fonts with the same character code. Hence, even when the number of search shapes is small, vector graphics shape data with a sufficiently high similarity can be found.

Fourth Embodiment

In the fourth embodiment, in addition to the third embodiment, an example of an apparatus that preferentially searches for structured vector graphics shape data contained in the contour information of outline fonts of characters having a common partial structure by referring to the partial structure of the character and records the shape data of vector graphics shape data with a high similarity and the contour information of outline font data will be described.

The vector graphics shape data generation apparatus according to the fourth embodiment will be described with reference to FIG. 18.

Figure 18:
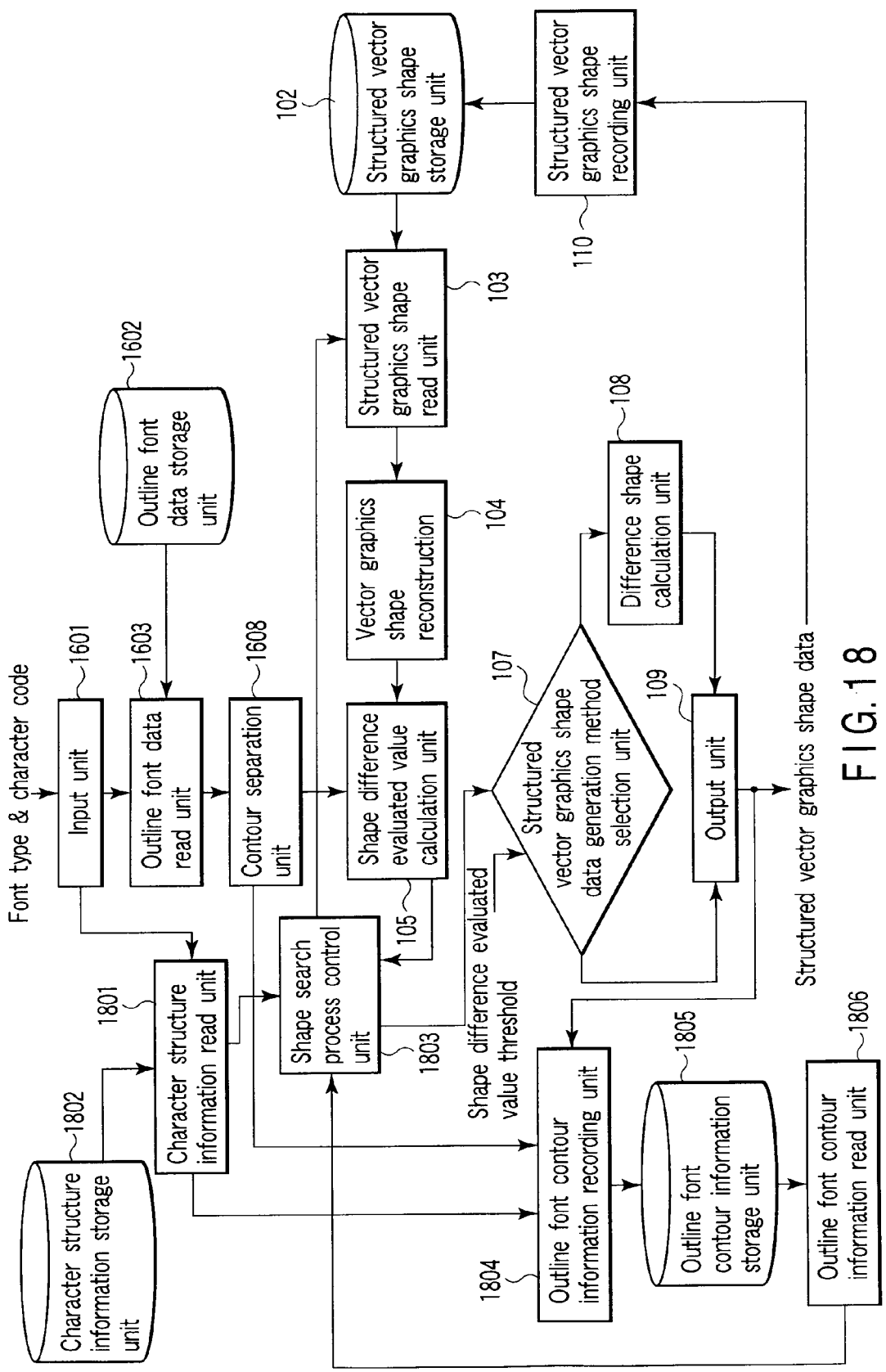
FIG. 18 is a block diagram of a vector graphics shape data generation apparatus according to the fourth embodiment.

As shown in FIG. 18, the vector graphics shape data generation apparatus of this embodiment includes an input unit 1601, outline font data storage unit 1602, outline font data read unit 1603, contour separation unit 1608, character structure information read unit 1801, character structure information storage unit 1802, shape search process control unit 1803, outline font contour information recording unit 1804, outline font contour information storage unit 1805, outline font contour information read unit 1806, structured vector graphics shape storage unit 102, structured vector graphics shape read unit 103, vector graphics shape reconstruction unit 104, shape difference evaluated value calculation unit 105, structured vector graphics shape data generation method selection unit 107, difference shape calculation unit 108, output unit 109, and structured vector graphics shape recording unit 110.

The character structure information read unit 1801 reads, from the character structure information storage unit 1802, character structure information corresponding to a font type and character code input to the input unit 1601. Character structure information indicates the "left-hand radical" and "right-hand radical" of a character specified by a font type and character code. Character structure information indicates that, e.g., a kanji character "板" is formed from kanji characters "木"and "反".

The character structure information storage unit 1802 stores the partial information of the character specified by the font type and character code. Partial information indicates, e.g., the left part or the right part of a character. The character structure information storage unit 1802 stores, e.g., information of the "left-hand radical" and "right-hand radical" of a kanji character specified by a font type and character code.

The shape search process control unit 1803 searches for a shape most similar to the vector graphics shape output from the contour separation unit 1608 from vector graphics shapes reconstructed from some data narrowed down as comparison candidates, by using the font type information, character code, and character structure information received from the character structure information read unit 1801, from the structured vector graphics shape data stored in the structured vector graphics shape storage unit 102.

The outline font contour information recording unit 1804 records, in the outline font contour information storage unit 1805, outline font contour information that associates the shape number, contour number, font type information, and character code received from the contour separation unit 1608, the character structure information received from the character structure information read unit 1801, and the structured vector graphics shape data received from the output unit 109 with each other.

Figures 19, 20:
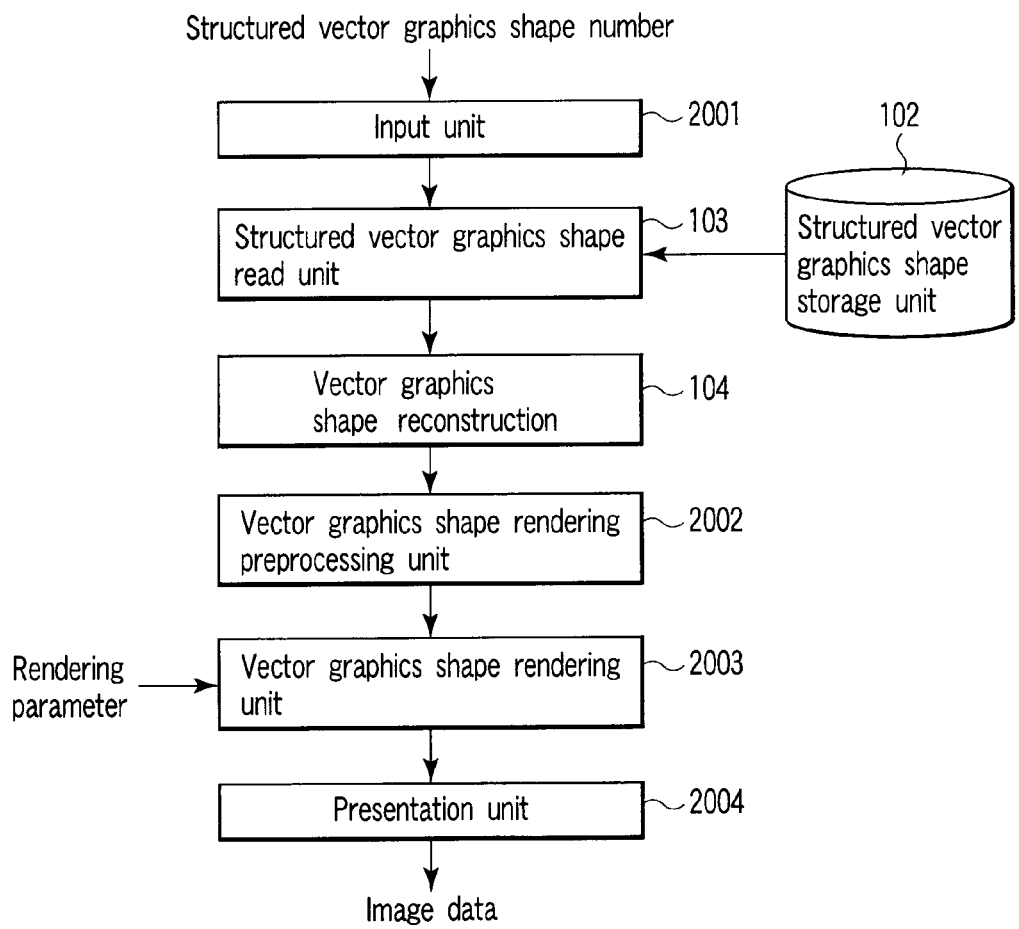
FIG. 19 is a view showing an example of outline font contour information data according to the four embodiment.
FIG. 20 is a block diagram of a rendering apparatus according to the fifth embodiment.

The outline font contour information storage unit 1805 stores the outline font contour information from the outline font contour information recording unit 1804. FIG. 19 shows an example of the data structure of the outline font contour information stored in the outline font contour information storage unit 1805. As shown in FIG. 19, the outline font contour information of this embodiment contains a font type, character code, character structure information, contour number, and shape number.

The outline font contour information read unit 1806 reads outline font contour information corresponding to the designated font type and character code from the outline font contour information storage unit 1805.

The vector graphics shape data generation apparatus of the third embodiment preferentially searches for a similar vector graphics shape by using a character code. Unlike this, the vector graphics shape data generation apparatus of the fourth embodiment includes the character structure information storage unit 1802 that stores character structure information in the apparatus in addition to character codes, and the character structure information read unit 1801 that reads character structure information corresponding to the font type and character code. Additionally, the vector graphics shape data generation apparatus of the fourth embodiment adds not only a contour number and shape number but also a font type, character code, and character structure information to the contour information stored in the outline font contour information storage unit 1805.

The shape search process control unit 1803 obtains, from the outline font contour information read unit 1806, a set CA of outline font contour information corresponding to the font type information, character code, and character structure information input to the input unit 1601. If a character code corresponding to, e.g., "板"is input, and the outline font contour information storage unit 1805 stores the outline font contour information of a character code corresponding to a kanji character "机"in advance, the outline font contour information read unit 1806 reads the contour information of "机" because both "板"and "机"have a partial structure "木". The outline font contour information read unit 1806 also reads the contour information of any kanji character (e.g., "坂"or "阪") except "机"if it has partial structure"木" or "反". When the structured vector graphics shape read unit 103 reads a structured vector graphics shape, the shape search process control unit 1803 preferentially searches for a shape number included in the set CA of contour information.

{Effect of Fourth Embodiment}

A kanji character has a partial structure, and for example, both "板" and "机"include a left-hand radical "木". The partial shape "木"of "板"and the partial structure "木" of "板"have a high shape similarity. In this embodiment, the shape search process control unit 1803 preferentially searches for structured vector graphics shape data contained in the contour information of outline fonts with the same partial structure. Hence, even when the number of search shapes is small, vector graphics shape data with a sufficiently high similarity can be found.

Fifth Embodiment

From the fifth embodiment on, a structured vector graphics shape data rendering apparatus will be described. In the fifth embodiment, an example of an apparatus that receives a structured vector graphics shape number and outputs a rendering result of a structured vector graphics corresponding to the received shape number will be described.

As shown in FIG. 20, the vector graphics rendering apparatus of this embodiment includes an input unit 2001, structured vector graphics shape storage unit 102, structured vector graphics shape read unit 103, vector graphics shape reconstruction unit 104, vector graphics shape rendering preprocessing unit 2002, vector graphics shape rendering unit 2003, and presentation unit 2004.

The input unit 2001 receives a shape number to specify structured vector graphics shape data from a data source and transfers the shape number to the structured vector graphics shape read unit 103.

The vector graphics shape rendering preprocessing unit 2002 executes a preprocess before rendering of a vector graphics reconstructed by the vector graphics shape reconstruction unit 104.

The vector graphics shape rendering unit 2003 renders the vector graphics shape preprocessed by the vector graphics shape rendering preprocessing unit 2002, on the basis of preset rendering parameters. The rendering parameters may be externally input by the user via the input unit 2001 and the like or set in each vector graphics rendering apparatus. The rendering parameters are numerical values to determine the rendering format, and for example, numerical values to determine the rendering size and color information. A technique disclosed in, e.g., "C. Loop and J. Blinn, "Resolution Independent Curve Rendering using Programmable Graphics Hardware", In Proc. of ACM SIGGRAPH2005, pp. 1000-1009" described above is used for the process of the vector graphics shape rendering unit 2003.

The presentation unit 2004 presents the rendering result by the vector graphics shape rendering unit 2003 as image data.

[Rendering Process]

The process of the vector graphics rendering apparatus will be described next in detail.

The process of causing the structured vector graphics shape read unit 103 to read, on the basis of a structured vector graphics shape number input to the input unit 2001, corresponding structured vector graphics shape data from the structured vector graphics shape storage unit 102 and causing the vector graphics shape reconstruction unit 104 to reconstruct it is the same as in the fifth embodiment.

The process contents of the vector graphics shape rendering preprocessing unit 2002 will be described next.

Figure 7:
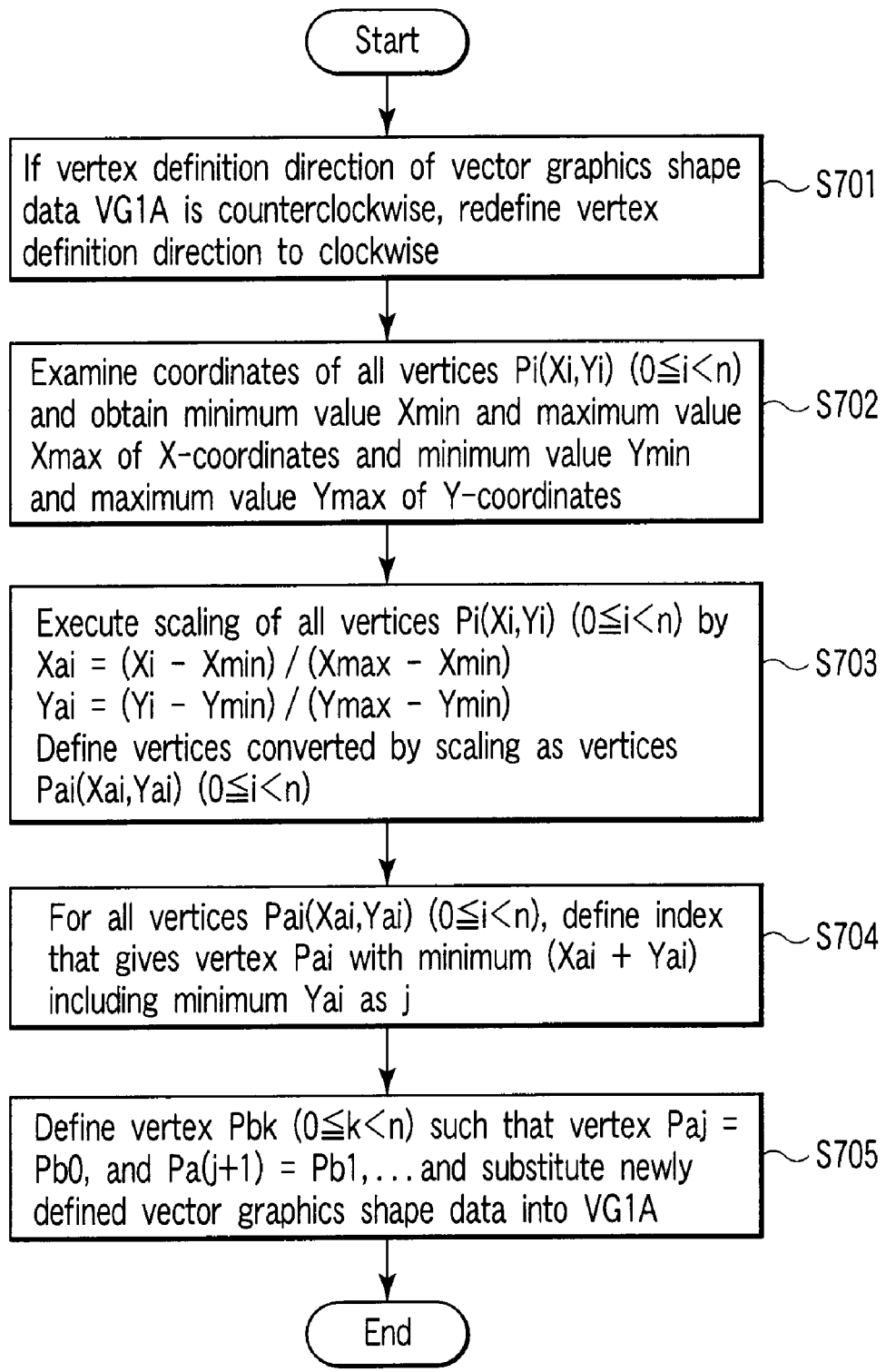
FIG. 7 is a flowchart showing an example of a shape normalization process in step S602 of FIG. 6.

In the vector graphics shape reconstructed by the vector graphics shape reconstruction unit 104, the vertex definition direction is set clockwise by the same process as in step S701 of FIG. 7. If it is determined by referring to a "vertex rotation direction C" that the vertex definition direction of the original vector graphics shape data is counterclockwise, the vertex definition direction is converted to counterclockwise.

In addition, scaling is done to set the vertex coordinate definition range to $0 \leq x, y \leq 1$. To restore the vertex definition range of the vector graphics before scaling, each vertex (Xai, Yai) ($0 \leq i < n$) is converted, by using a "scaling coordinate value K" in the structured vector graphics shape data, into (Xi,Yi) by $$Xi = Xai \times (K(Xmax) - K(Xmin)) + K(Xmin),$$

$$Yi = Yai \times (K(Ymax) - K(Ymin)) + K(Ymin)$$

The presentation unit 2004 outputs the rendering result as image data.

{Effect of Fifth Embodiment}

In the process of the first embodiment, each structured vector graphics shape stored in the structured vector graphics shape storage unit 102 can be designated by a shape number S. The vector graphics rendering apparatus of the fifth embodiment can receive the shape number S and output the rendering result of a corresponding vector graphics shape as image data.

Sixth Embodiment

In the sixth embodiment, an example of an apparatus that receives an outline font number and outputs a rendering result of a structured vector graphics corresponding to the received outline font number will be described.

Figure 21:
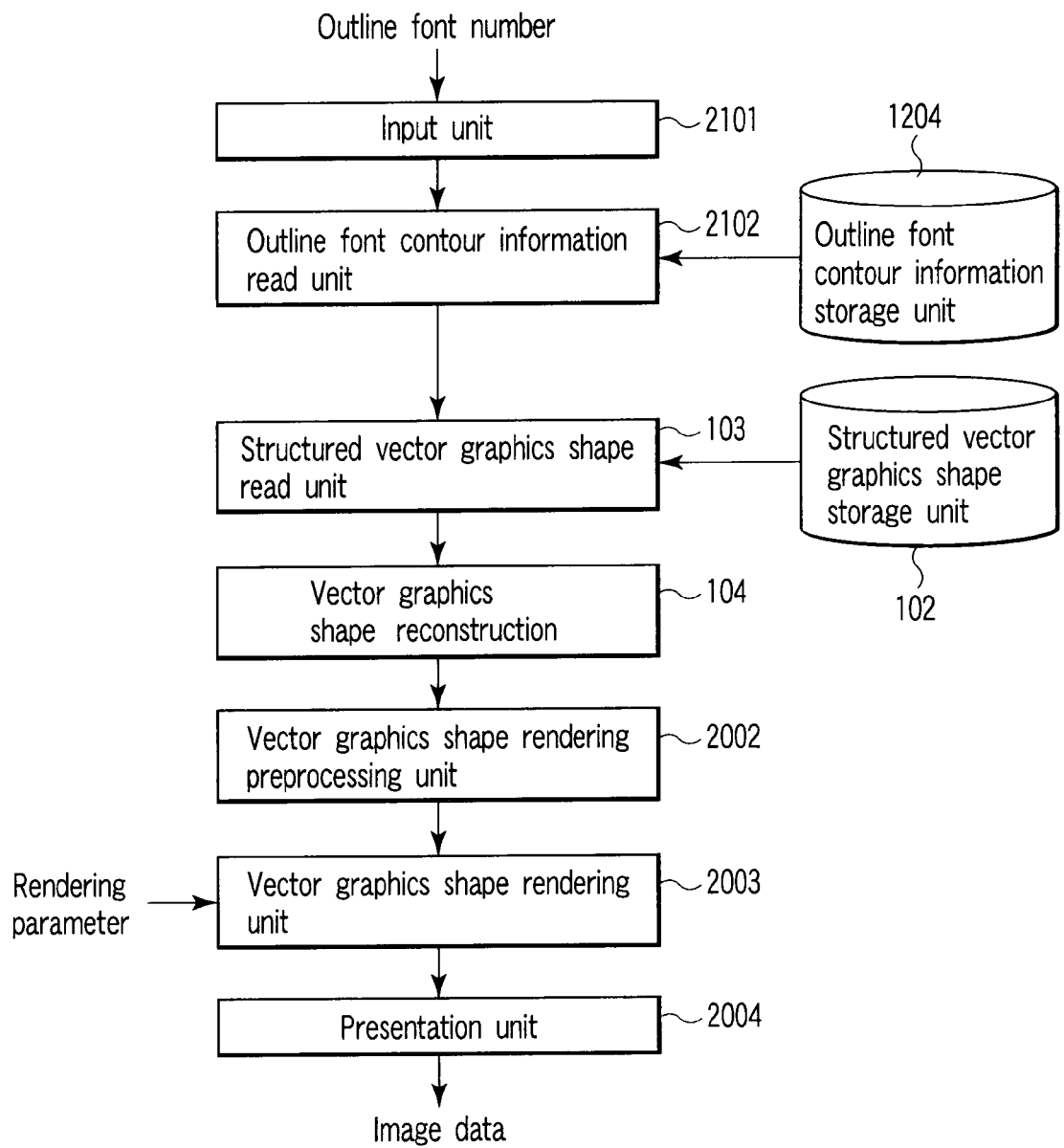
FIG. 21 is a block diagram of a rendering apparatus according to the sixth embodiment.

As shown in FIG. 21, the vector graphics rendering apparatus of this embodiment includes an input unit 2101, outline font contour information read unit 2102, outline font contour information storage unit 1204, structured vector graphics shape storage unit 102, structured vector graphics shape read unit 103, vector graphics shape reconstruction unit 104, vector graphics shape rendering preprocessing unit 2002, vector graphics shape rendering unit 2003, and presentation unit 2004.

The input unit 2101 receives an outline font number from a data source and transfers the number to the outline font contour information read unit 2102.

The outline font contour information read unit 2102 reads, from the outline font contour information storage unit 1204, outline font contour information corresponding to the outline font number input by the input unit 2101.

[Rendering Process]

The process of the vector graphics rendering apparatus will be described below in detail.

The outline font contour information read unit 2102 reads, from the outline font contour information storage unit 1204, outline font contour information corresponding to the outline font number input to the input unit 2101. The outline font contour information contains a plurality of contours. Hence, the units from the structured vector graphics shape read unit 103 to the vector graphics shape rendering preprocessing unit 2002 in FIG. 21 process each contour.

The process of causing the structured vector graphics shape read unit 103 to read, for each contour contained in the outline font contour information, corresponding structured vector graphics shape data from the structured vector graphics shape storage unit 102, and causing the vector graphics shape reconstruction unit 104 to reconstruct it and the process by the vector graphics shape rendering preprocessing unit 2002 are the same as in the fifth embodiment.

{Effect of Sixth Embodiment}

In the process of the second embodiment, each outline font contour information stored in the outline font contour information storage unit 1204 can be designated by an outline font number F. The rendering apparatus of the sixth embodiment can receive the outline font number F and output the rendering result of a corresponding vector graphics shape as image data.

Seventh Embodiment

In the seventh embodiment, an example of an apparatus that receives a font type and character code and outputs a rendering result of a structured vector graphics corresponding to the received font type and character code will be described.

Figure 22:
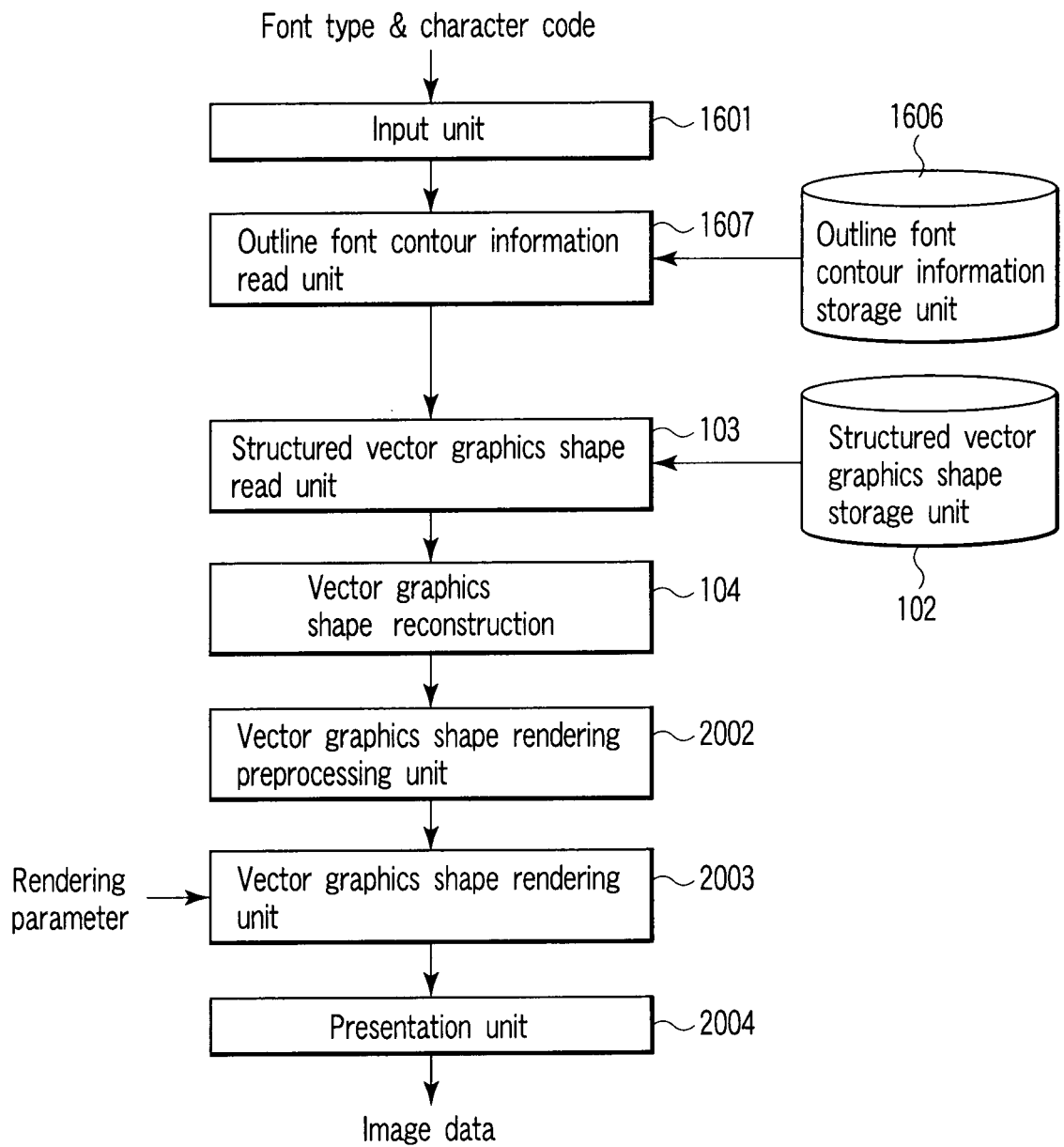
FIG. 22 is a block diagram of a rendering apparatus according to the seventh embodiment.

As shown in FIG. 22, the vector graphics rendering apparatus of this embodiment includes an input unit 1601, outline font contour information storage unit 1606, outline font contour information read unit 1607, structured vector graphics shape storage unit 102, structured vector graphics shape read unit 103, vector graphics shape reconstruction unit 104, vector graphics shape rendering preprocessing unit 2002, vector graphics shape rendering unit 2003, and presentation unit 2004.

[Rendering Process]

The process of the vector graphics rendering apparatus will be described below in detail.

The outline font contour information read unit 1607 reads, from the outline font contour information storage unit 1606, outline font contour information corresponding to the font type and character code input to the input unit 1601. The outline font contour information contains a plurality of contours. Hence, the units from the structured vector graphics shape read unit 103 to the vector graphics shape rendering preprocessing unit 2002 in FIG. 22 process each contour.

The process of causing the structured vector graphics shape read unit 103 to read, for each contour contained in the outline font contour information, corresponding structured vector graphics shape data from the structured vector graphics shape storage unit 102, and causing the vector graphics shape reconstruction unit 104 to reconstruct it and the process by the vector graphics shape rendering preprocessing unit 2002 are the same as in the fifth embodiment.

{Effect of Seventh Embodiment}

In the process of the third or fourth embodiment, each outline font contour information stored in the outline font contour information storage unit 1606 can be designated by a font type and character code. The apparatus of the seventh embodiment can receive a font type and character code and output the rendering result of a corresponding vector graphics shape as image data.

According to the vector graphics shape data generation apparatus, rendering apparatus, method, and program according to the embodiments, an interactive application with higher expression power can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vector graphics shape data generation apparatus comprising:
an acquisition unit configured to acquire a first shape data element of vector graphics from a data source;
a first storage unit configured to store a plurality of sets of a second shape data element as structured vector graphics data obtained by processing vector graphics shape data in accordance with a specific format and a shape number corresponding to the second shape data element;
a first read unit configured to read the second shape data element corresponding to a designated shape number from the first storage unit;
a reconstruction unit configured to reconstruct a vector graphics shape corresponding to the read second shape data element;
a first calculation unit configured to calculate a shape difference evaluated value which decreases as a similarity between a vector graphics shape corresponding to the first shape data element and the reconstructed vector graphics shape increases to obtain a plurality of shape difference evaluated values;
a second calculation unit configured to calculate a minimum shape difference evaluated value of the shape difference evaluated values and a new second shape data element corresponding to the minimum shape difference evaluated value;
a comparison unit configured to compare the minimum shape difference evaluated value with a threshold; and
a third calculation unit configured to calculate a difference shape data element representing a difference shape between a shape based on the first shape data element and a shape based on the new second shape data element if the minimum shape difference evaluated value is not more than the threshold,
wherein if the minimum shape difference evaluated value is more than the threshold, the first storage unit stores the first shape data element as structured vector graphics shape data, and if the minimum shape difference evaluated value is not more than the threshold, the first storage unit stores the difference shape data element as structured vector graphics shape data,
each of the first shape data element and the second shape data element includes a contour of one closed curve formed by connecting line segments or quadratic Bezier curve, and
the acquisition unit includes:
an acquisition unit configured to acquire outline font data from the data source,
a separation unit configured to separate the acquired outline font data into contours, and
a conversion unit configured to convert one of the contours into the first shape data element; and
the apparatus further comprises a second storage unit configured to store contour information that associates the one of the contours with the structured vector graphics shape data.

2. A vector graphics shape generation apparatus comprising:
an acquisition unit configured to acquire a first shape data element of vector graphics from a data source;
a first storage unit configured to store a plurality of sets of a second shape data element as structured vector graphics data obtained by processing vector graphics shape data in accordance with a specific format and a shape number corresponding to the second shape data element;
a first read unit configured to read the second shape data element corresponding to a designated shape number from the first storage unit;
a reconstruction unit configured to reconstruct a vector graphics shape corresponding to the read second shape data element;
a first calculation unit configured to calculate a shape difference evaluated value which decreases as a similarity between a vector graphics shape corresponding to the first shape data element and the reconstructed vector graphics shape increases to obtain a plurality of shape difference evaluated values;
a second calculation unit configured to calculate a minimum shape difference evaluated value of the shape difference evaluated values and a new second shape data element corresponding to the minimum shape difference evaluated value;
a comparison unit configured to compare the minimum shape difference evaluated value with a threshold; and
a third calculation unit configured to calculate a difference shape data element representing a difference shape between a shape based on the first shape data element and a shape based on the new second shape data element if the minimum shape difference evaluated value is not more than the threshold,
wherein if the minimum shape difference evaluated value is more than the threshold, the first storage unit stores the first shape data element as structured vector graphics shape data, and if the minimum shape difference evaluated value is not more than the threshold, the first storage unit stores the difference shape data element as structured vector graphics shape data
each of the first shape data element and the second shape data element includes a contour of one closed curve formed by connecting line segments or quadratic Bezier curve, and
the acquisition unit includes:
an acquisition unit configured to acquire a font type information element and a character code from the data source,
a second storage unit configured to store a plurality of outline font data elements each corresponding to a font type information element and a character code,
a second read unit configured to read an outline font data element corresponding to the acquired font type information element and the acquired character code from the second storage unit,
a separation unit configured to separate the read outline font data element into contours, and
a conversion unit configured to convert one of the contours into the first shape data element;
the apparatus further comprises:
a third storage unit configured to store contour information that associates the one of the contours, the acquired font type information element and the acquired character code, and the structured vector graphics shape data with each other; and
a third read unit configured to read contour information corresponding to the acquired font type information element and the acquired character code from the third storage unit, and
the first read unit preferentially reads a second shape data element corresponding to a shape data element contained in the read contour information.

3. A vector graphics shape generation apparatus comprising:
an acquisition unit configured to acquire a first shape data element of vector graphics from a data source;
a first storage unit configured to store a plurality of sets of a second shape data element as structured vector graphics data obtained by processing vector graphics shape data in accordance with a specific format and a shape number corresponding to the second shape data element;
a first read unit configured to read the second shape data element corresponding to a designated shape number from the first storage unit;
a reconstruction unit configured to reconstruct a vector graphics shape corresponding to the read second shape data element;
a first calculation unit configured to calculate a shape difference evaluated value which decreases as a similarity between a vector graphics shape corresponding to the first shape data element and the reconstructed vector graphics shape increases to obtain a plurality of shape difference evaluated values;
a second calculation unit configured to calculate a minimum shape difference evaluated value of the shape difference evaluated values and a new second shape data element corresponding to the minimum shape difference evaluated value;
a comparison unit configured to compare the minimum shape difference evaluated value with a threshold; and
a third calculation unit configured to calculate a difference shape data element representing a difference shape between a shape based on the first shape data element and a shape based on the new second shape data element if the minimum shape difference evaluated value is not more than the threshold,
wherein if the minimum shape difference evaluated value is more than the threshold, the first storage unit stores the first shape data element as structured vector graphics shape data, and if the minimum shape difference evaluated value is not more than the threshold, the first storage unit stores the difference shape data element as structured vector graphics shape data
each of the first shape data element and the second shape data element includes a contour of one closed curve formed by connecting line segments or quadratic Bezier curve, and
the acquisition unit includes:
an acquisition unit configured to acquire a font type information element and a character code from the data source,
a second storage unit configured to store a plurality of outline font data elements each corresponding to a font type information element and a character code,
a second read unit configured to read an outline font data element corresponding to the acquired font type information element and the acquired character code from the second storage unit,
a separation unit configured to separate the read outline font data element into contours, and
a conversion unit configured to convert one of the contours into the first shape data element;
the apparatus further comprises:
a third storage unit configured to store contour information elements that associates the one of the contours, the acquired font type information element and the acquired character code, and the structured vector graphics shape data with each other; and
a third read unit configured to read a contour information element corresponding to the acquired font type information element and the acquired character code from the third storage unit; and
the first read unit preferentially reads a second shape data element corresponding to a shape data element contained in the contour information element.

4. A vector graphics shape generation apparatus comprising:
an acquisition unit configured to acquire a first shape data element of vector graphics from a data source;
a first storage unit configured to store a plurality of sets of a second shape data element as structured vector graphics data obtained by processing vector graphics shape data in accordance with a specific format and a shape number corresponding to the second shape data element;
a first read unit configured to read the second shape data element corresponding to a designated shape number from the first storage unit;
a reconstruction unit configured to reconstruct a vector graphics shape corresponding to the read second shape data element;
a first calculation unit configured to calculate a shape difference evaluated value which decreases as a similarity between a vector graphics shape corresponding to the first shape data element and the reconstructed vector graphics shape increases to obtain a plurality of shape difference evaluated values;
a second calculation unit configured to calculate a minimum shape difference evaluated value of the shape difference evaluated values and a new second shape data element corresponding to the minimum shape difference evaluated value;
a comparison unit configured to compare the minimum shape difference evaluated value with a threshold; and
a third calculation unit configured to calculate a difference shape data element representing a difference shape between a shape based on the first shape data element and a shape based on the new second shape data element if the minimum shape difference evaluated value is not more than the threshold,
wherein if the minimum shape difference evaluated value is more than the threshold, the first storage unit stores the first shape data element as structured vector graphics shape data, and if the minimum shape difference evaluated value is not more than the threshold, the first storage unit stores the difference shape data element as structured vector graphics shape data,
each of the first shape data element and the second shape data element includes a contour of one closed curve formed by connecting line segments or quadratic Bezier curve, and
the acquisition unit includes:
an acquisition unit configured to acquire a font type information element and a character code from the data source,
a second storage unit configured to store a plurality of outline font data elements each corresponding to a font type information element and a character code,
a second read unit configured to read an outline font data element corresponding to the acquired font type information element and the acquired character code from the second storage unit,
a separation unit configured to separate the read outline font data element into contours, and
a conversion unit configured to convert one of the contours into the first shape data element;

the apparatus further comprises:
a third storage unit configured to store a plurality of character structure information elements each containing a set of a font type information element and a character code and partial information of a character corresponding to the font type and the character code;
a third read unit configured to read a character structure information element corresponding to the acquired font type information element and the acquired character code from the third storage unit;
a fourth storage unit configured to store contour information elements that associates the one of the contours, the acquired font type information element and the acquired character code, the read character structure information element, and the structured vector graphics shape data with each other; and
a fourth read unit configured to read a contour information element corresponding to the acquired font type information element and the acquired character code from the fourth storage unit; and
the first read unit preferentially reads a second shape data element corresponding to a shape data element contained in the contour information and the character structure information.

* * * * *